United States Patent
Zhu et al.

(10) Patent No.: US 11,991,382 B2
(45) Date of Patent: May 21, 2024

(54) MOTION VECTOR MANAGEMENT FOR DECODER SIDE MOTION VECTOR REFINEMENT

(71) Applicants: Beijing Bytedance Network Technology Co., Ltd., Beijing (CN); Bytedance Inc., Los Angeles, CA (US)

(72) Inventors: Weijia Zhu, San Diego, CA (US); Hongbin Liu, Beijing (CN); Kai Zhang, San Diego, CA (US); Li Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 302 days.

(21) Appl. No.: 17/463,838

(22) Filed: Sep. 1, 2021

(65) Prior Publication Data

US 2021/0400299 A1    Dec. 23, 2021

Related U.S. Application Data

(63) Continuation of application No. PCT/CN2020/077604, filed on Mar. 3, 2020.

(30) Foreign Application Priority Data

Mar. 4, 2019    (WO) ................ PCT/CN2019/076860
Mar. 3, 2020    (WO) ................ PCT/CN2020/077604

(51) Int. Cl.
*H04N 19/105*    (2014.01)
*H04N 19/176*    (2014.01)
(Continued)

(52) U.S. Cl.
CPC ......... *H04N 19/513* (2014.11); *H04N 19/105* (2014.11); *H04N 19/176* (2014.11); *H04N 19/46* (2014.11)

(58) Field of Classification Search
CPC .. H04N 19/513; H04N 19/105; H04N 19/176; H04N 19/46; H04N 19/55;
(Continued)

(56) References Cited

U.S. PATENT DOCUMENTS 7,627,037 B2    12/2009    Li et al.
9,247,246 B2    1/2016    Lu et al.
(Continued)

FOREIGN PATENT DOCUMENTS

CN    101325710 A    12/2008
CN    102868879 A    1/2013
(Continued)

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

(Continued)

*Primary Examiner* — Tat C Chio
(74) *Attorney, Agent, or Firm* — Perkins Coie LLP

(57) ABSTRACT

Motion Vector Management for Decoder Side Motion Vector Refinement is disclosed. A method of video processing including: determining, for a conversion between a first block of video and a bitstream representation of the first block of video, whether and/or how to apply decoder-side motion vector refinement (DMVR) based on a signaled information; and performing the conversion based on the determination.

20 Claims, 30 Drawing Sheets

(51) Int. Cl.
*H04N 19/46* (2014.01)
*H04N 19/513* (2014.01)

(58) Field of Classification Search
CPC ...... H04N 19/52; H04N 19/537; H04N 19/70; H04N 19/577
See application file for complete search history.

(56) References Cited

U.S. PATENT DOCUMENTS

| | | | |
|---|---|---|---|
| 9,294,777 | B2 | 3/2016 | Wang |
| 9,521,425 | B2 | 12/2016 | Chen et al. |
| 9,641,852 | B2 | 5/2017 | Lu et al. |
| 9,667,996 | B2 | 5/2017 | Chen et al. |
| 9,762,927 | B2 | 9/2017 | Chen et al. |
| 9,838,712 | B2 | 12/2017 | Lin et al. |
| 10,523,964 | B2 | 12/2019 | Chuang et al. |
| 10,645,382 | B2 | 5/2020 | Zhang et al. |
| 10,764,592 | B2 | 9/2020 | Zhang et al. |
| 10,779,002 | B2 | 9/2020 | Chen et al. |
| 2014/0286408 | A1 | 9/2014 | Zhang et al. |
| 2015/0181216 | A1 | 6/2015 | Zhang et al. |
| 2018/0041769 | A1 | 2/2018 | Chuang et al. |
| 2019/0020895 | A1 | 1/2019 | Liu et al. |
| 2019/0132606 | A1* | 5/2019 | Su .................. H04N 19/119 |
| 2019/0306502 | A1 | 10/2019 | Gadde et al. |
| 2020/0275112 | A1* | 8/2020 | Chiang .............. H04N 19/107 |
| 2020/0280736 | A1* | 9/2020 | Wang ................. H04N 19/463 |
| 2020/0344475 | A1 | 10/2020 | Zhu et al. |
| 2020/0382795 | A1 | 12/2020 | Zhang et al. |
| 2020/0396453 | A1 | 12/2020 | Zhang et al. |
| 2021/0029362 | A1 | 1/2021 | Liu et al. |
| 2021/0051339 | A1 | 2/2021 | Liu et al. |
| 2021/0076063 | A1 | 3/2021 | Liu et al. |
| 2021/0092435 | A1 | 3/2021 | Liu et al. |
| 2021/0360284 | A1* | 11/2021 | Lai ..................... H04N 19/70 |

FOREIGN PATENT DOCUMENTS

| | | |
|---|---|---|
| CN | 103024370 A | 4/2013 |
| CN | 108781294 A | 11/2018 |
| CN | 109417629 A | 3/2019 |
| CN | 109417630 A | 3/2019 |
| WO | 2013040994 A1 | 3/2013 |
| WO | 2017133661 A1 | 8/2017 |
| WO | 2018113658 A1 | 6/2018 |
| WO | 2018127119 A1 | 7/2018 |
| WO | 2018212578 A1 | 11/2018 |
| WO | 2019010156 A1 | 1/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-0369, 2018.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.

Liu et al. "AHG11: MMVD without Fractional Distances for SCC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0255, 2019.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Sethuraman, Sriram. "CE9: Results of DMVR Related Tests CE9. 2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.

JEM-7.0: https://jvet.hhi.fraunhofer.de/svn/svn_HMJEMSoftware/tags/ HM-16.6-JEM-7.0.

https://vcgit.hhi.fraunhofer.de/jvet/VVCSoftware_VTM/tree/VTM-4.0.

International Search Report and Written Opinion from PCT/CN2020/077604 dated May 29, 2020 (10 pages).

International Search Report and Written Opinion from PCT/CN2020/077605 dated Apr. 24, 2020 (9 pages).

International Search Report and Written Opinion from PCT/CN2020/077606 dated May 28, 2020 (9 pages).

* cited by examiner

Positions of spatial merge candidates

Candidate pairs considered for redundancy check of spatial merge candidates

Positions for the second PU of N×2N and 2N×N partitions

Illustration of motion vector scaling for temporal merge candidate

Candidate positions for temporal merge candidate, C0 and C1

Original Merge candidate list

| Merge_idx | L0 | L1 |
|---|---|---|
| 0 | mvL0_A,ref0 | - |
| 1 | - | mvL1_B,ref0 |
| 2 | | |
| 3 | | |
| 4 | | |

Merge candidate list after adding combined candidates

| Merge_idx | L0 | L1 |
|---|---|---|
| 0 | mvL0_A,ref0 | |
| 1 | | mvL1_B,ref0 |
| 2 | mvL0_A,ref0 | mvL1_B,ref0 |
| 3 | | |
| 4 | | |

Example of combined bi-predictive merge candidate

*FIG. 7*

Derivation process for motion vector prediction candidates

Illustration of motion vector scaling for spatial motion vector candidate

Neighbouring samples used for deriving IC parameters

Example of Affine MVF per sub-block 6-parameter affine model 4-paramenter affine model MVP for AF_INTER for inherited affine candidates MVP for AF_INTER for constructed affine candidates Five neighboring blocks Candidates for AF_MERGE  
CPMV predictor derivation Candidates position for affine merge mode DMVR based on bilateral template matching an example of MVD (0, 1) mirrored between list 0 and list 1 in DMVR MVs that may be checked in one iteration required reference samples with padding

MOTION VECTOR MANAGEMENT FOR DECODER SIDE MOTION VECTOR REFINEMENT

CROSS-REFERENCE TO RELATED APPLICATION

This application is a continuation of International Patent Application No. PCT/CN2020/077604, filed on Mar. 3, 2020, which claims the priority to and benefits of International Patent Application No. PCT/CN2019/076788, filed on Mar. 3, 2019, and No. PCT/CN2019/076860, filed on Mar. 4, 2019. All of the aforementioned applications are incorporated by reference as part of the disclosure of this application.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes performing a conversion between a current video block and a bitstream representation of the current video block, wherein a use of a decoder motion information is indicated in a flag in the bitstream representation such that a first value of the flag indicates that the decoder motion information is enabled during the conversion and a second value of the flag indicates that the decoder motion information is disabled during the conversion.

In another representative aspect, the disclosed technology may be used to provide another method for video processing. This method includes performing a conversion between a current video block and a bitstream representation of the current video block, wherein a use of a decoder motion information is indicated in a flag in the bitstream representation such that a first value of the flag indicates that the decoder motion information is enabled during the conversion and a second value of the flag indicates that the decoder motion information is disabled during the conversion, and in response to determining that an initial motion vector of the video block has sub-pixel precision, skipping checks associated with a temporary motion vector derived from the initial motion vector and a candidate motion vector difference, wherein the temporary motion vector has integer-pixel precision or sub-pixel precision.

In another representative aspect, the disclosed technology may be used to provide another method for video processing. This method includes: determining, for a conversion between a first block of video and a bitstream representation of the first block of video, whether and/or how to apply decoder-side motion vector refinement (DMVR) based on a signaled information; and performing the conversion based on the determination.

In another representative aspect, the disclosed technology may be used to provide another method for video processing. This method includes: determining, for a conversion between a first block of video and a bitstream representation of the first block of video, whether and/or how to apply Bi-directional Optical flow (BIO) based on a signaled information; and performing the conversion based on the determination.

In another representative aspect, the disclosed technology may be used to provide another method for video processing. This method includes: determining, for a conversion between a first block of video and a bitstream representation of the first block of video, whether decoder-side motion vector refinement (DMVR) process is enabled or disabled based on at least one of: one or more initial motion vectors associated with the first block and one or more reference pictures associated with the first block, the initial motion vectors including motion vectors before applying DMVR process; and performing the conversion based on the determination.

In another representative aspect, the disclosed technology may be used to provide another method for video processing. This method includes: determining, for a conversion between a first block of video and a bitstream representation of the first block of video, whether Bi-directional Optical flow (BIO) process is enabled or disabled based on at least one of: one or more initial motion vectors associated with the first block and one or more reference pictures associated with the first block, the initial motion vectors including motion vectors before applying BIO process and/or decoded motion vectors before applying decoder-side motion vector refinement (DMVR) process; and performing the conversion based on the determination.

In another representative aspect, the disclosed technology may be used to provide another method for video processing. This method includes: determining, for a conversion between a first block of video and a bitstream representation of the first block of video, whether Bi-directional Optical flow (BIO) process is enabled or disabled based on one or more motion vector difference between initial motion vectors associated with the first block and one or more refined motion vectors, the initial motion vectors including motion vectors before applying BIO process and/or applying DMVR process, the refined motion vectors including motion vectors after applying DMVR process; and performing the conversion based on the determination.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 7 shows an example of generating a combined bi-predictive merge candidate.

DETAILED DESCRIPTION

1. Video Coding in HEVC/H.265

Figure 1:
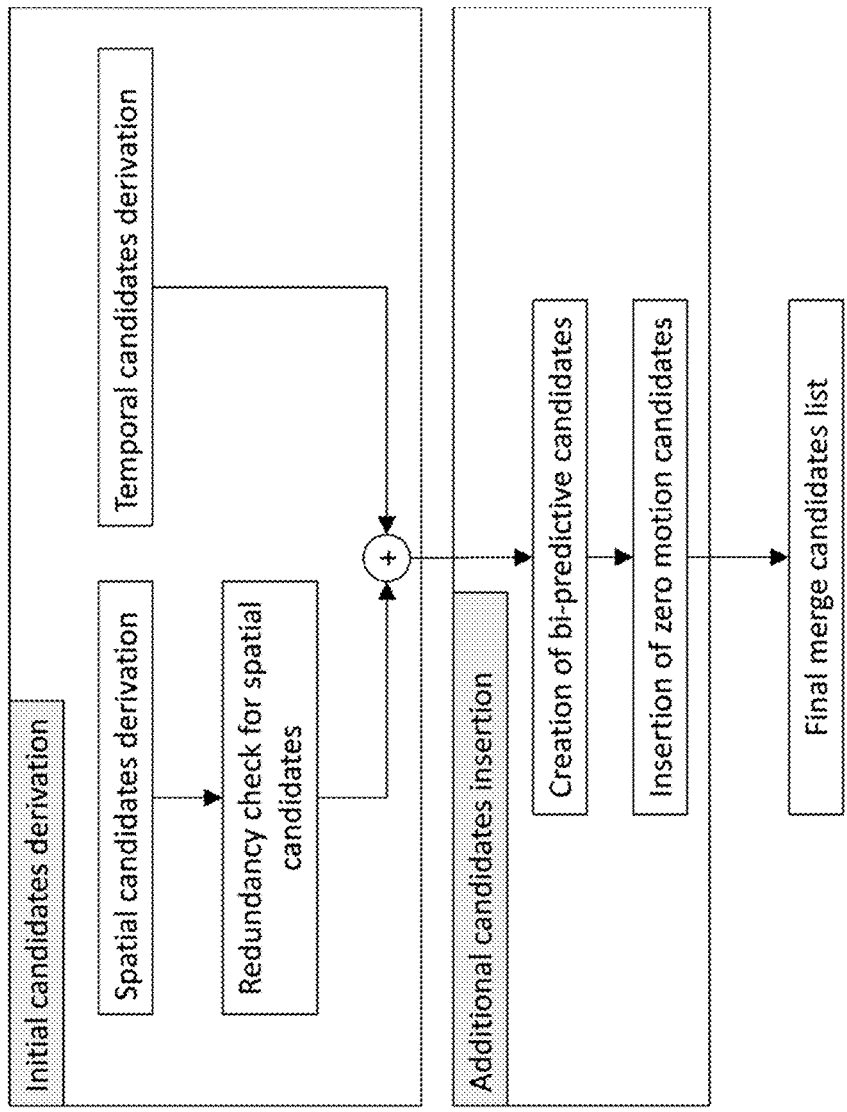
FIG. 1 shows an example of constructing a merge candidate list.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at: http://phenix.it-sudparis.eu/jvet/doc_end_user/documents/13_Marrakesh/wg11/JVET-M1001-v5.zip. The latest reference software of VVC, named VTM, could be found at: https://vcgit.hhi.fraunhofer.de/jvet/VVCSoftware_VTM/tree/VTM-4.0.

2.1. Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as "uni-prediction." Uni-prediction is available both for P-slices and B-slices.

When signaling indicates that both of the reference picture lists are to be used, the PU is produced from two blocks of samples. This is referred to as "bi-prediction." Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order. Also, the current picture can be on the list of reference pictures in HEVC version 4.

2.1.2. Merge Mode

2.1.2.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2. Spatial Candidates Derivation

Figure 2:
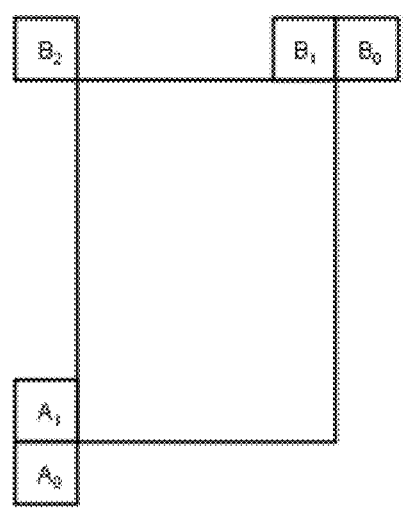
FIG. 2 shows an example of positions of spatial candidates.
Figure 3:
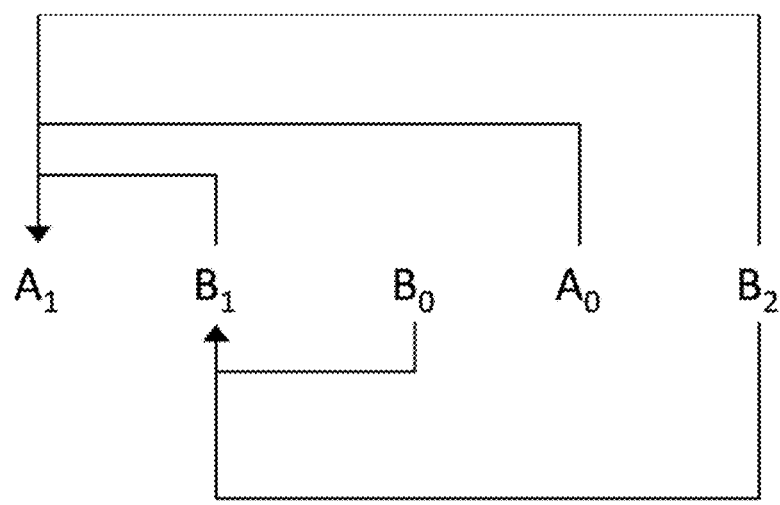
FIG. 3 shows an example of candidate pairs subject to a redundancy check of spatial merge candidates.
Figures 4A, 4B:
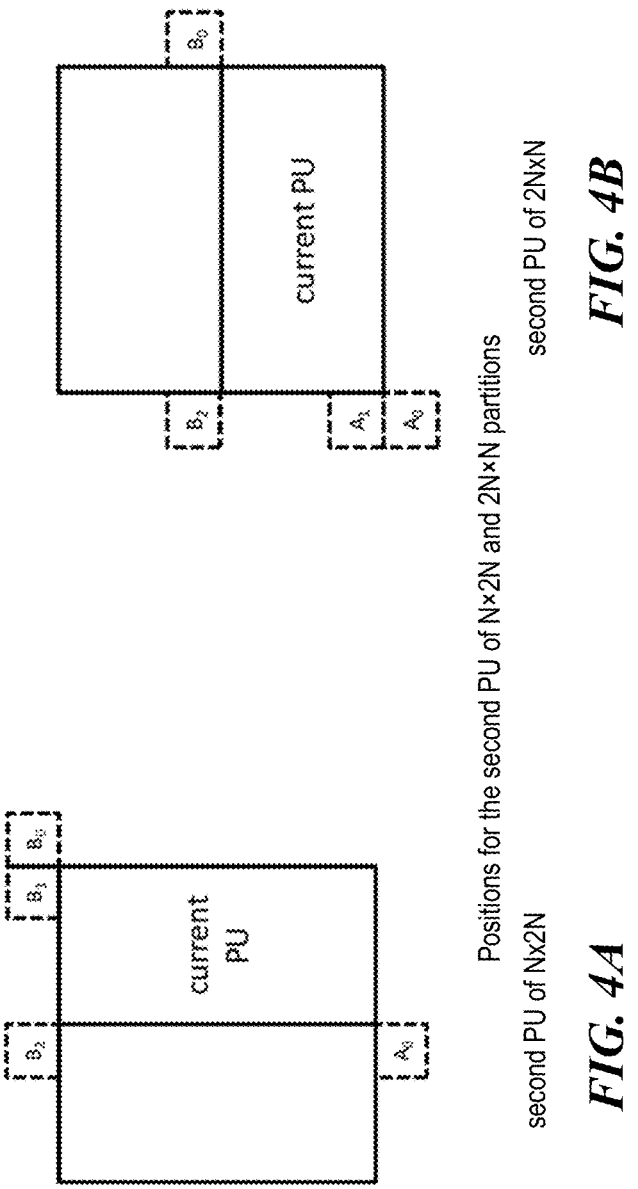
FIGS. 4A and 4B show examples of the position of a second prediction unit (PU) based on the size and shape of the current block.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3. Temporal Candidates Derivation

Figure 5:
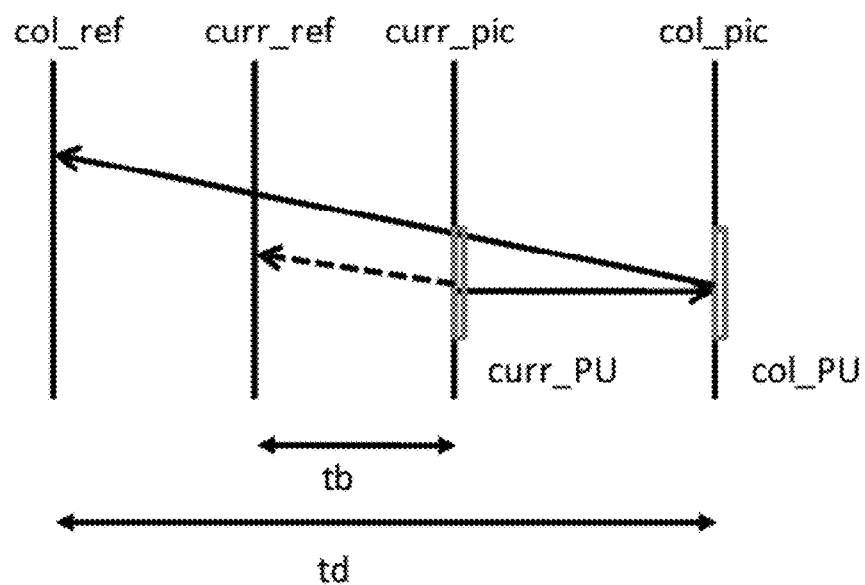
FIG. 5 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
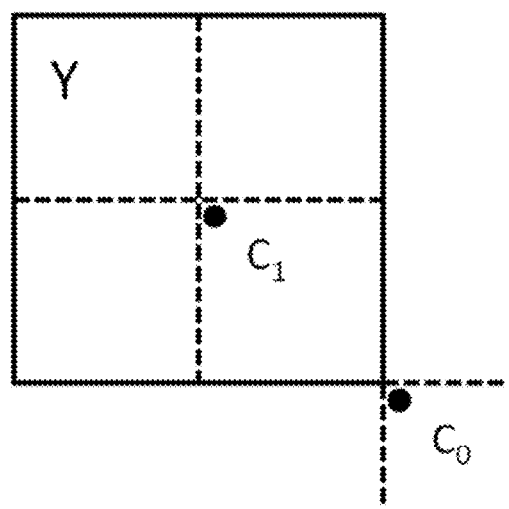
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU a/k/a. LCU, largest coding unit) row, position $C_1$ is used. Otherwise, position $C_0$ is used in the derivation of the temporal merge candidate.

2.1.2.4. Additional Candidates Insertion

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3. AMVP

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1. Derivation of AMVP Candidates

Figure 8:
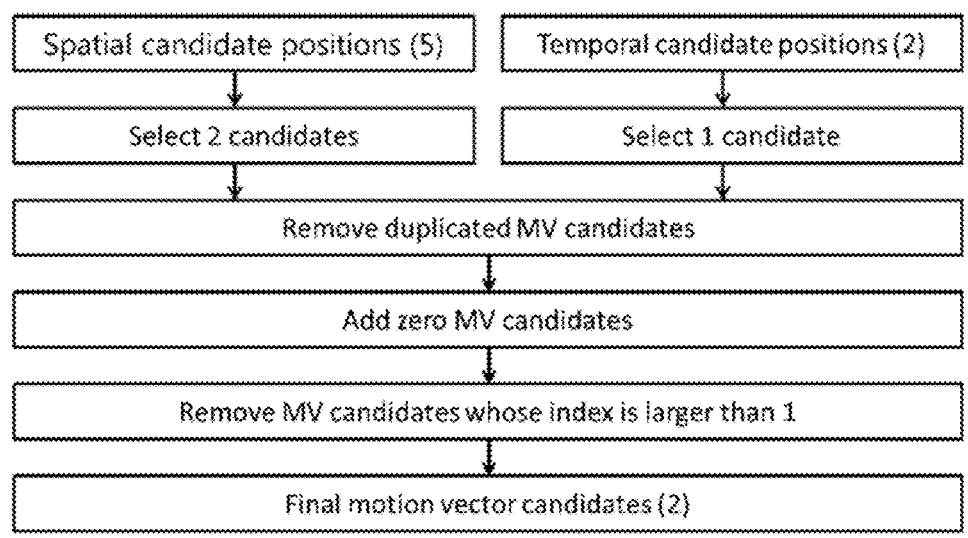
FIG. 8 shows an example of constructing motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not where spatial scaling is not used, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
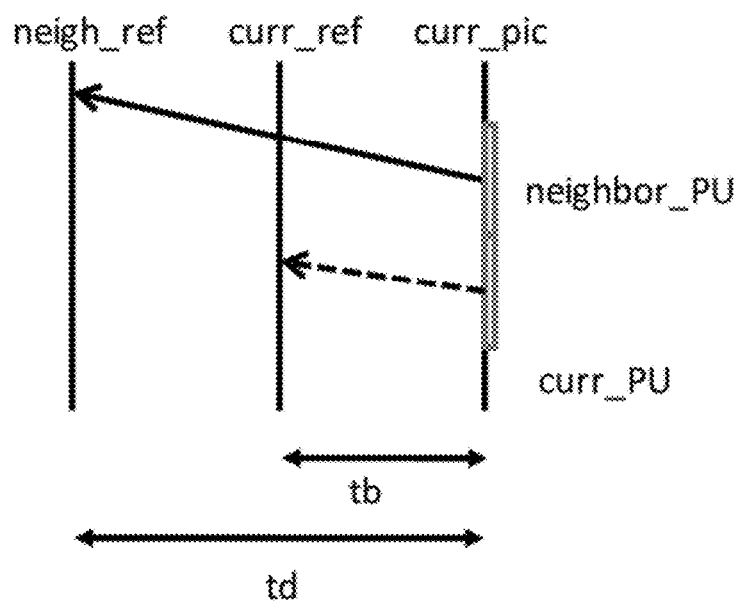
FIG. 9 shows an example of motion vector scaling for spatial motion vector candidates.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. Local Illumination Compensation in JEM

Local Illumination Compensation (LIC) is based on a linear model for illumination changes, using a scaling factor a and an offset b. And it is enabled or disabled adaptively for each inter-mode coded coding unit (CU).

Figure 10:
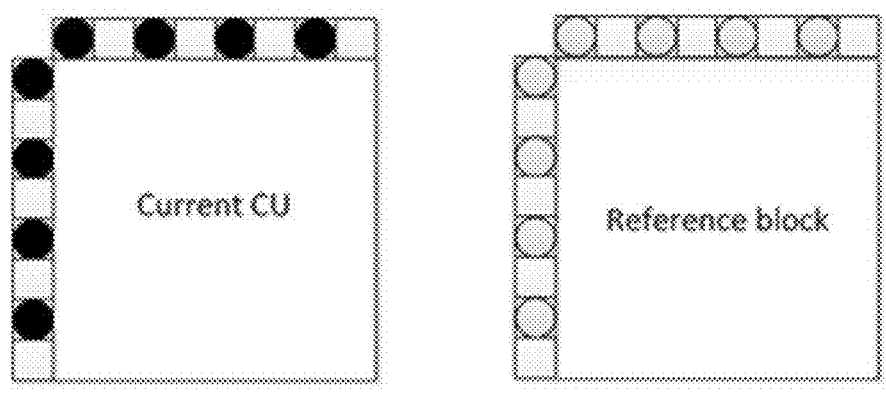
FIG. 10 show examples of neighboring samples for deriving local illumination compensation parameters.

When LIC applies for a CU, a least square error method is employed to derive the parameters a and b by using the neighboring samples of the current CU and their corresponding reference samples. More specifically, as illustrated in FIG. 10, the subsampled (2:1 subsampling) neighboring samples of the CU and the corresponding samples (identified by motion information of the current CU or sub-CU) in the reference picture are used.

2.2.1 Derivation of Prediction Blocks

The LIC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion refinement and fractional pel motion refinement, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3. Inter Prediction Methods in VVC

There are several new coding tools for inter prediction improvement, such as Adaptive motion vector difference resolution (AMVR) for signaling MVD, affine prediction mode, Triangular prediction mode (TPM), Advanced TMVP (ATMVP, a/k/a SbTMVP), Generalized Bi-Prediction (GBI), Bi-directional Optical flow (BIO).

2.3.1. Coding Block Structure in VVC

In VVC, a QuadTree/BinaryTree/MulitpleTypeTree (QT/BT/TT) structure is adopted to divide a picture into square or rectangle blocks.

Besides QT/BT/TT, separate tree (a.k.a. Dual coding tree) is also adopted in VVC for I-slices/tiles. With separate tree, the coding block structure are signaled separately for the luma and chroma components.

2.3.2. Adaptive Motion Vector Difference Resolution

In HEVC, motion vector differences (MVDs) (between the motion vector and predicted motion vector of a PU) are signaled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., 1/4-pel, 1-pel, 4-pel). The MVD resolution is controlled at the coding unit (CU) level, and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.3.3. Affine Motion Compensation Prediction

Figure 11A:
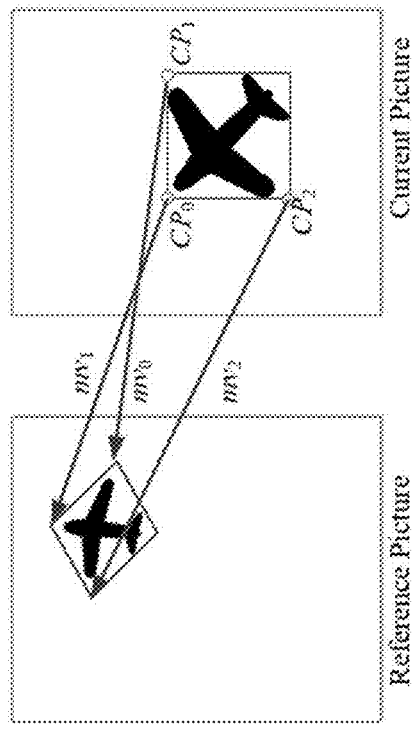
FIGS. 11A and 11B show illustrations in connection with a 4-parameter affine model and a 6-parameter affine model respectively.
Figure 11B:
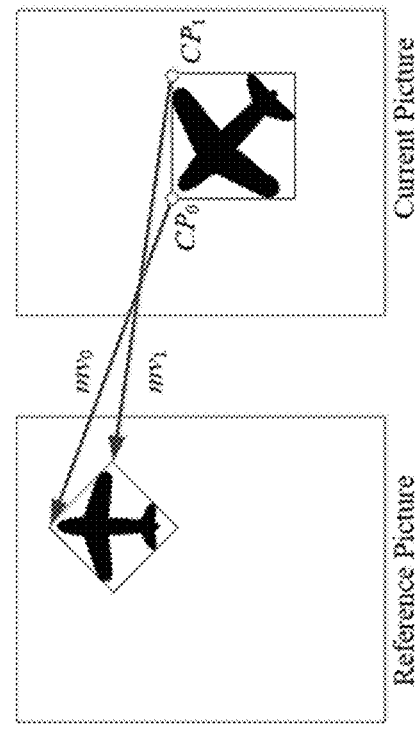

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 11, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x,y) = ax - by + e = \frac{(mv_1^h - mv_0^h)}{w}x - \frac{(mv_1^v - mv_0^v)}{w}y + mv_0^h \\ mv^v(x,y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x,y) = ax + cy + e = \frac{(mv_1^h - mv_0^h)}{w}x + \frac{(mv_2^h - mv_0^h)}{h}y + mv_0^h \\ mv^v(x,y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mvv(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 12:
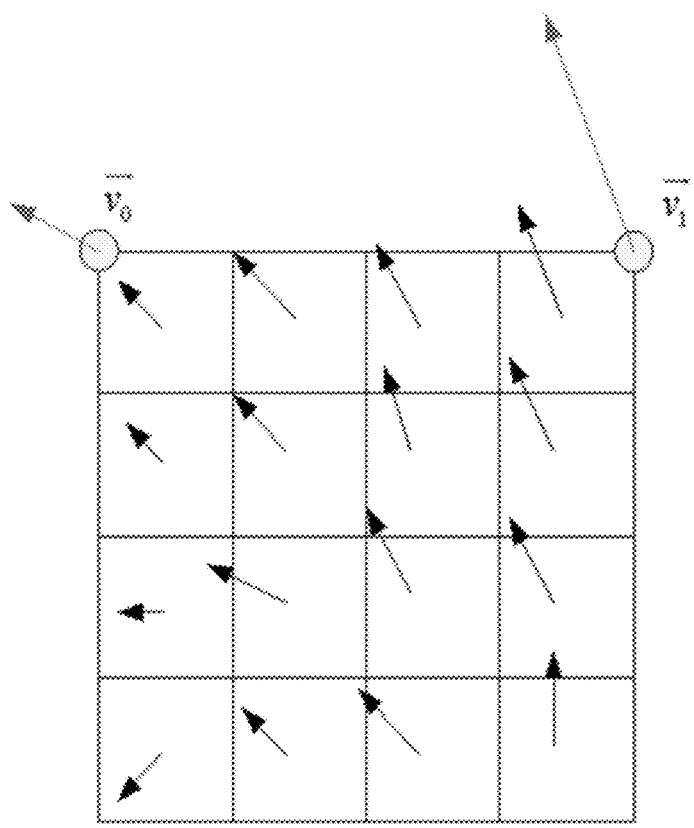
FIG. 12 shows an example of an affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 12, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.3.3.1. Signaling of Affine Prediction

Similar to the translational motion model, there are also two modes for signaling the side information due affine prediction. They are AFFINE_INTER and AFFINE_MERGE modes.

2.3.3.2. AF_INTER Mode

For CUs with both width and height larger than 8, AF_INTER mode can be applied. An affine flag in CU level is signaled in the bitstream to indicate whether AF_INTER mode is used.

Figure 13B:
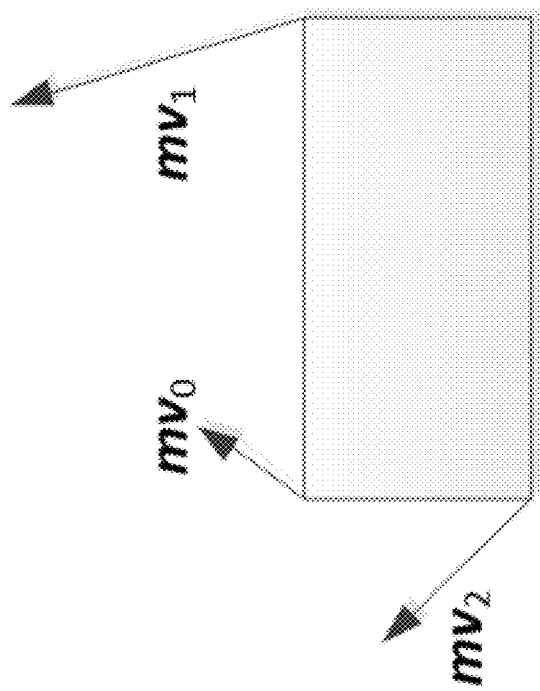
FIGS. 13A and 13B show examples of a 4-parameter affine model and a 6-parameter affine model respectively.
Figure 13A:
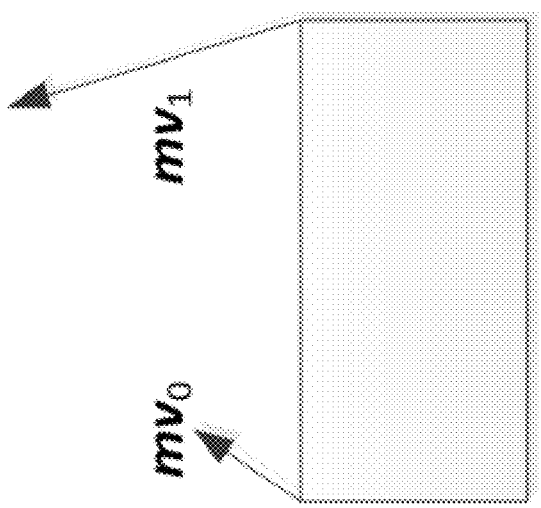
Figure 14:
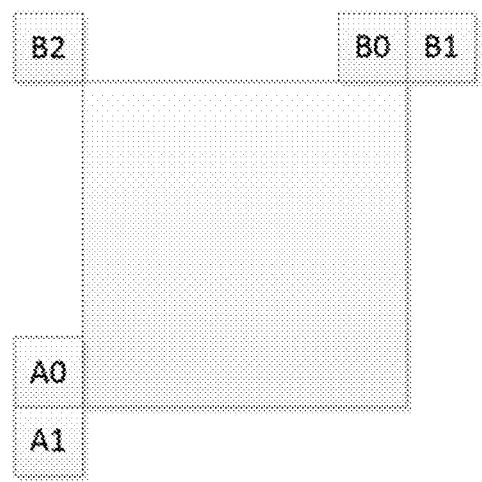
FIG. 14 shows an example of motion vector prediction for affine inter mode for inherited affine candidates.
Figure 15:
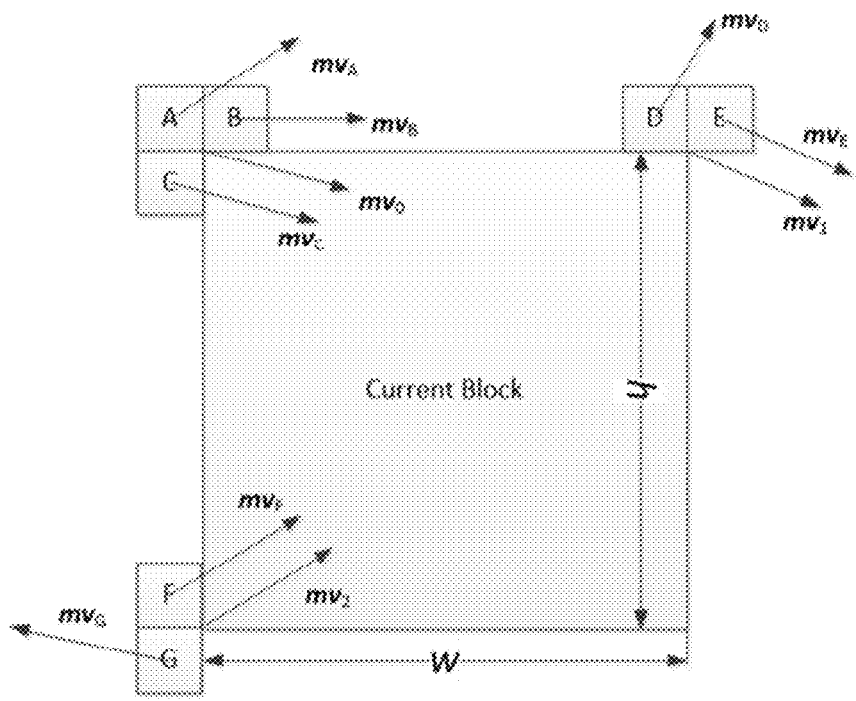
FIG. 15 shows an example of motion vector prediction for affine inter mode for constructed affine candidates.
Figures 16A, 16B:
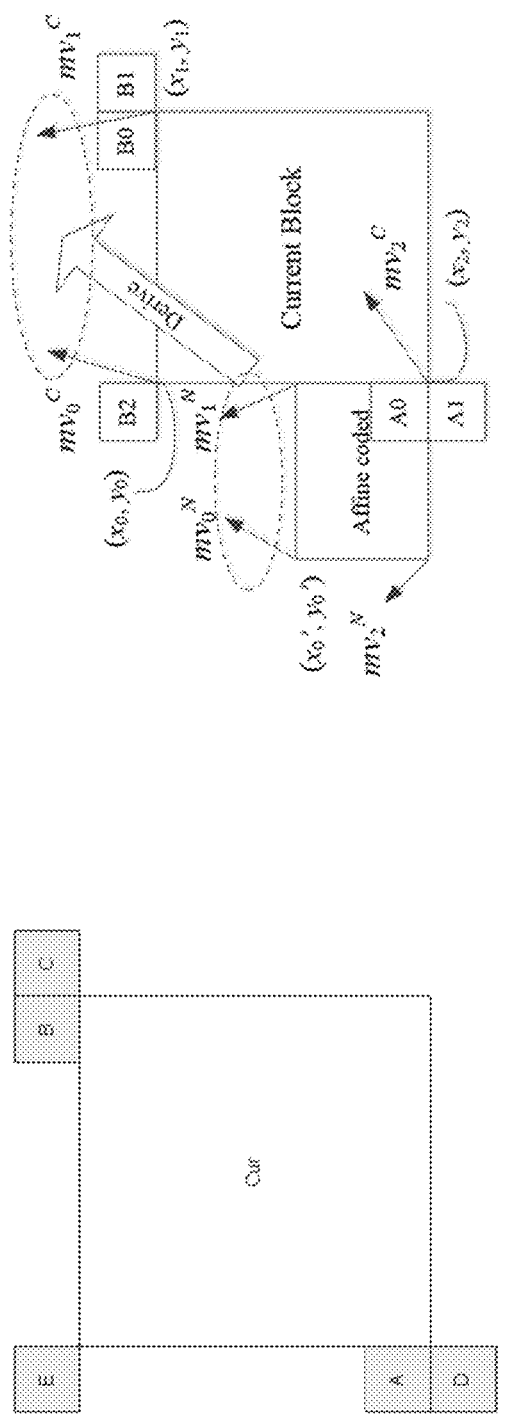
FIGS. 16A and 16B show illustrations in connection with an affine merge mode.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 15) and the estimated CPMVs are signaled. In addition, the index of affine AMVP candidate from which the estimated CPMVs are derived is further signaled.
   1) Inherited Affine Motion Predictors
   The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B$_2$} that is affine coded and has the same reference picture as in current block. The five blocks A1, A0, B1, B0, B$_2$ are depicted in FIG. 14.
   Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 16B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.
   2) Constructed Affine Motion Predictors
   A constructed affine motion predictor consists of control-point motion vectors (CPMVs) that are derived from neighboring inter coded blocks, as shown in FIG. 15, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.
   If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.
   If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.
   No pruning process is applied when inserting a constructed affine motion predictor into the candidate list.
   3) Normal AMVP Motion Predictors
   The following applies until the number of affine motion predictors reaches the maximum.
      1) Derive an affine motion predictor by setting all CPMVs equal to $\overline{mv}_2$ if available.
      2) Derive an affine motion predictor by setting all CPMVs equal to $\overline{mv}_1$ if available.
      3) Derive an affine motion predictor by setting all CPMVs equal to $\overline{mv}_0$ if available.
      4) Derive an affine motion predictor by setting all CPMVs equal to HEVC TMVP if available.
      5) Derive an affine motion predictor by setting all CPMVs to zero MV.
   Note that $\overline{mv}_i$ is already derived in constructed affine motion predictor.
   In AF_INTER mode, when 4/6-parameter affine mode is used, 2/3 control points are used, and therefore 2/3 MVD needs to be coded for these control points, as shown in FIG. 13. It is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 13B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3. AF_MERGE Mode

When a CU is applied in AF_MERGE mode, it gets the first block coded with affine mode from the valid neighbor reconstructed blocks. And the selection order for the candidate block is from left, above, above right, left bottom to above left as shown in FIG. 16A (denoted by A, B, C, D, E in order). For example, if the neighbor left bottom block is coded in affine mode as denoted by A0 in FIG. 16B, the Control Point (CP) motion vectors $mv_0^N$, $mv_1^N$ and $mv_2^N$ of the top left corner, above right corner and left bottom corner of the neighboring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in the current VTM, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signaled in the bitstream when there is at least one neighbor block is coded in affine mode.

An affine merge candidate list is constructed with following steps:
   1) Insert inherited affine candidates
      Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B$_2$}.

2) Insert constructed affine candidates

Figure 17:
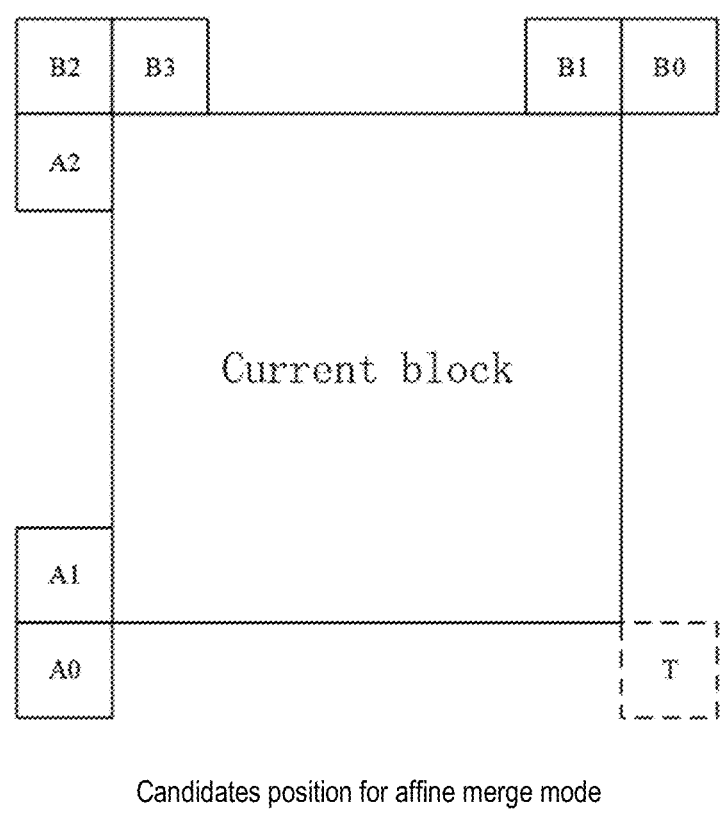
FIG. 17 shows examples of candidate positions for an affine merge mode

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 17. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with zero motion vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

In VTM4, the CPMVs of affine CUs are stored in a separate buffer. The stored CPMVs are only used to generate the inherited CPMVPs in affine merge mode and affine AMVP mode for the lately coded CUs. The sub-block MVs derived from CPMVs are used for motion compensation, MV derivation of merge/AMVP list of translational MVs and de-blocking. To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right sub-block MVs in the line buffer instead of the CPMVs are used for the affine MVP derivation. In this way, the CPMVs are only stored in local buffer. If the candidate CU is 6-parameter affine coded, the affine model is degraded to 4-parameter model.

2.3.4. Merge with Motion Vector Differences (MMVD)

In JVET-L0054, ultimate motion vector expression (UMVE, also known as MMVD) is presented. UMVE is used for either skip or merge modes with a proposed motion vector expression method.

Figure 18:
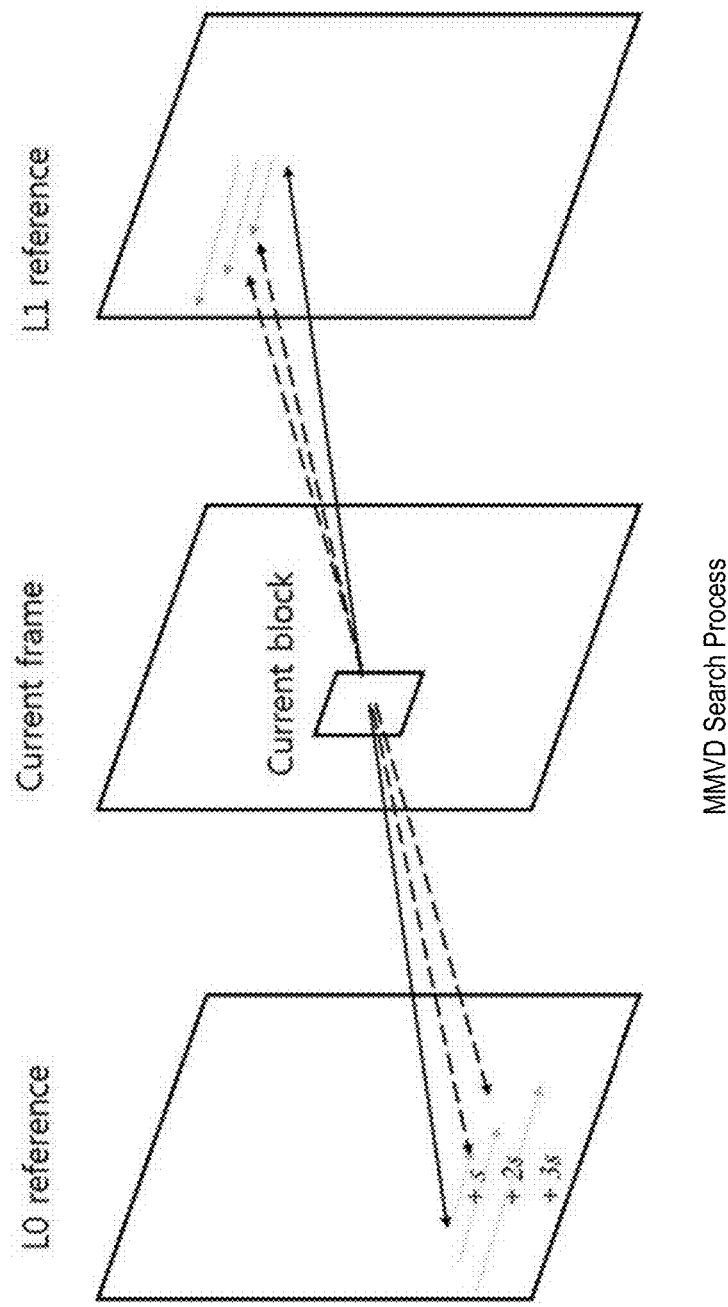
FIG. 18 shows an example of a merge with motion vector differences (MMVD) mode search process.
Figure 19:
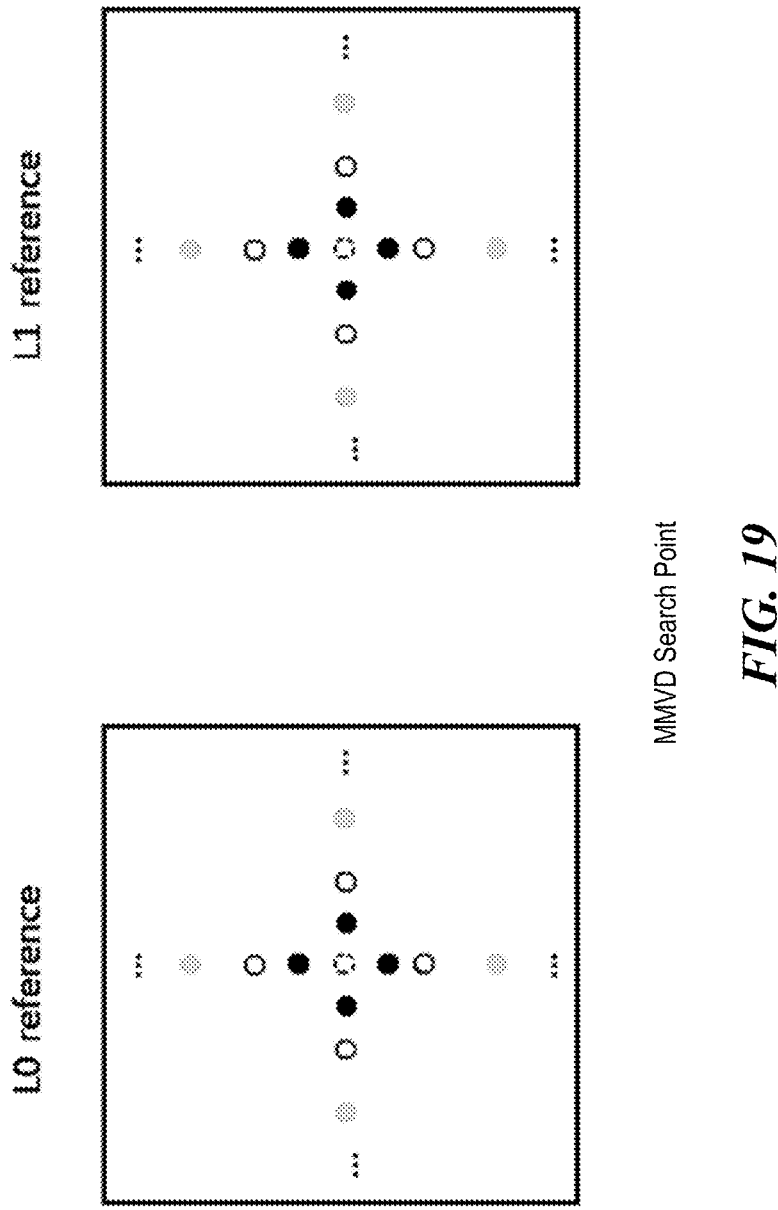
FIG. 19 shows an example of a MMVD search point.

FIG. 18 shows an example of an ultimate vector expression (UMVE) search process. FIG. 19 shows an example of a UMVE search point. UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| N$^{th}$ MVP | 1$^{st}$ MVP | 2$^{nd}$ MVP | 3$^{rd}$ MVP | 4$^{th}$ MVP |

If the number of base candidates is equal to 1, Base candidate IDX is not signaled.

Distance index is motion magnitude information. Distance index indicates the pre-defined distance from the starting point information. Pre-defined distance is as follows:

TABLE 2

| | Distance IDX | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| | Direction IDX | | | |
|---|---|---|---|---|
| Direction IDX | 00 | 01 | 10 | 11 |
| x-axis | + | − | N/A | N/A |
| y-axis | N/A | N/A | + | − |

UMVE flag is singnaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

In addition, a flag, tile_group_fpel_mmvd_enabled_flag, is signalled to the decoder in the slice header whether to use fractional distances or not. When fractional distances are disabled, distances in the default table are all multiplied by 4, i.e., the distance table {1, 2, 4, 8, 16, 32, 64, 128}-pel is used. Because size of the distance table is not changed, entropy coding of the distance index is not changed.

2.3.5. Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

2.3.5.1. DMVR in JEM

Figure 20:
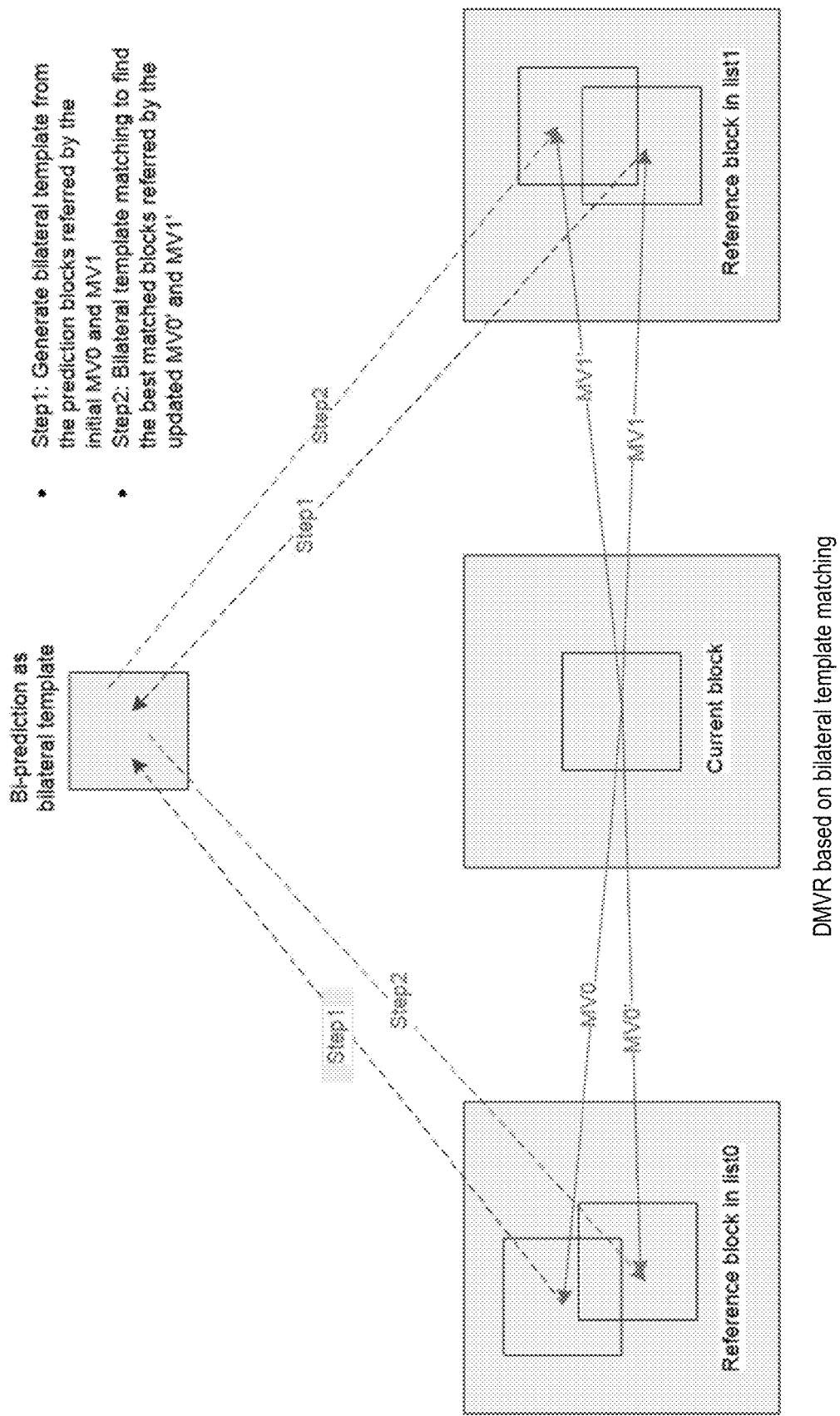
FIG. 20 shows an example of decoder-side motion video refinement (DMVR) in JEM7.

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 20. The bilateral template is generated as the weighted combination (i.e. average) of the two prediction blocks, from the initial MV0 of list0 and MV1 of list1, respectively, as shown in FIG. 20. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 20, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

2.3.5.2. DMVR in VVC

Figure 21:
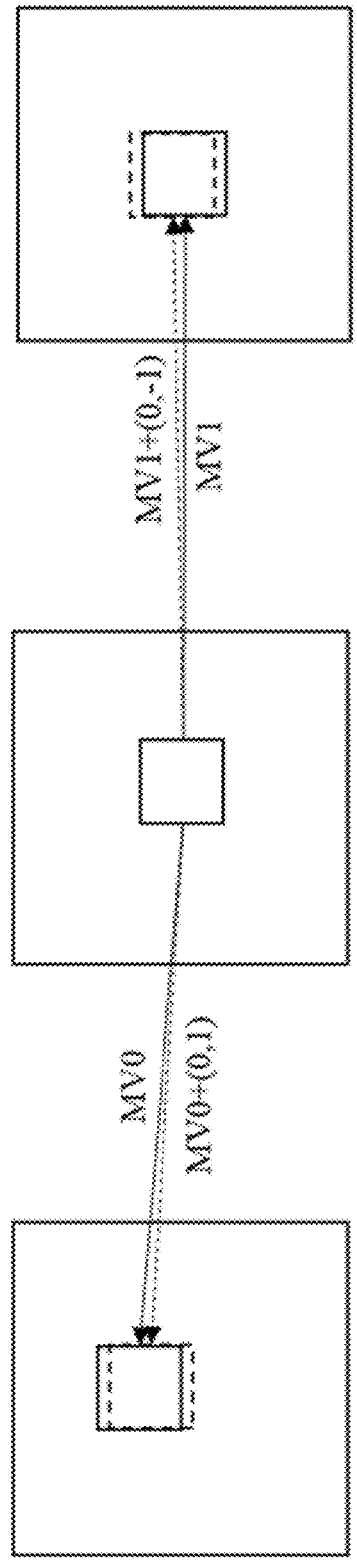
FIG. 21 show an example of motion vector difference (MVD) in connection with DMVR.

For DMVR in VVC, MVD mirroring between list 0 and list 1 is assumed as shown in FIG. 21, and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 22:
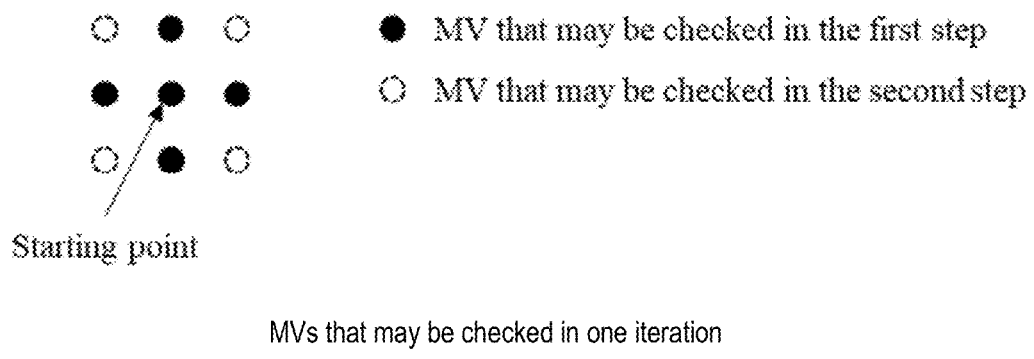
FIG. 22 show an example illustrating checks on motion vectors.

The motion vector refinement process may iterate twice. In each iteration, at most 6 MVDs (with integer-pel precision) may be checked in two steps, as shown in FIG. 22. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

$MvdX=-1;$ $MvdY=-1;$

If $(Sad(1, 0)<Sad(-1,0))$ $MvdX=1;$

If $(Sad(0,1)<Sad(0,-1))$ $MvdY=1;$

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

Also, the DMVR in VVC first performs integer MVD refinement as described above. This is the first step. After that, an MVD refinement on fractional precision is conditionally performed to further refine the motion vector. This is the second step. The condition whether to perform the second step is based on whether the MVD after the current iteration is a zero MV. If it's a zero MV (vertical and horizontal components of a MV is 0.), the second step will be performed.

The details of fractional MVD refinement are given as follows. It should be noted that the MVD denotes the different between the initial motion vector and the final motion vector used in motion compensation.

A parametric error surface is fitted using integer distance positions and the costs evaluated in these positions, which is then used to determine $1/16^{th}$-pel precision sub-pixel offsets.

The proposed method is summarized below:
1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0, y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2(((0,-1)+E(0,1)-2E(0,0)))$$

$(x_0, y_0)$ can be computed to any desired sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast shifted subtraction based implementation of the 2 divisions associated per CU.
3. The computed $(x_0, y_0)$ are added to the integer distance refinement MV to get the sub-pixel accurate refinement delta MV.

Magnitude of the derived fraction motion vector is constrained to be smaller than or equal to half pixel.

To further simplify the process of DMVR, JVET-M0147 proposed several changes to the design in JEM. More specifically, the adopted DMVR design to VTM-4.0 (to be released soon) has the following main features:

Early termination when (0,0) position SAD between list0 and list1 is smaller than a threshold.

Early termination when SAD between list0 and list1 is zero for some position.

Block sizes for DMVR: W*H>=64 && H>=8, wherein W and H are the width and height of the block.

Split the CU into multiple of 16×16 sub-blocks for DMVR of CU size>16*16. If only width or height of the CU is larger than 16, it is only split in vertical or horizontal direction.

Reference block size (W+7)*(H+7) (for luma).

25 points SAD-based integer-pel search (i.e. (+−) 2 refinement search range, single stage)

Bilinear-interpolation based DMVR.

"Parametric error surface equation" based sub-pel refinement. This procedure is performed only when the minimum SAD cost is not equal to zero and the best MVD is (0, 0) in the last MV refinement iteration.

Luma/chroma MC w/ reference block padding (if needed).

Refined MVs used for MC and TMVPs only.

2.3.5.2.1 Usage of DMVR

When the following conditions are all true, DMVR may be enabled:

DMVR enabling flag in the SPS (i.e., sps_dmvr_enabled_flag) is equal to 1

TPM flag, inter-affine flag and subblock merge flag (either ATMVP or affine merge), MMVD flag are all equal to 0

Merge flag is equal to 1

Current block is bi-predicted, and POC distance between current picture and reference picture in list 1 is equal to the POC distance between reference picture in list 0 and current picture The current CU height is greater than or equal to 8

Number of luma samples (CU width*height) is greater than or equal to 64

2.3.5.2.2. Reference Samples in DMVR

Figure 23:
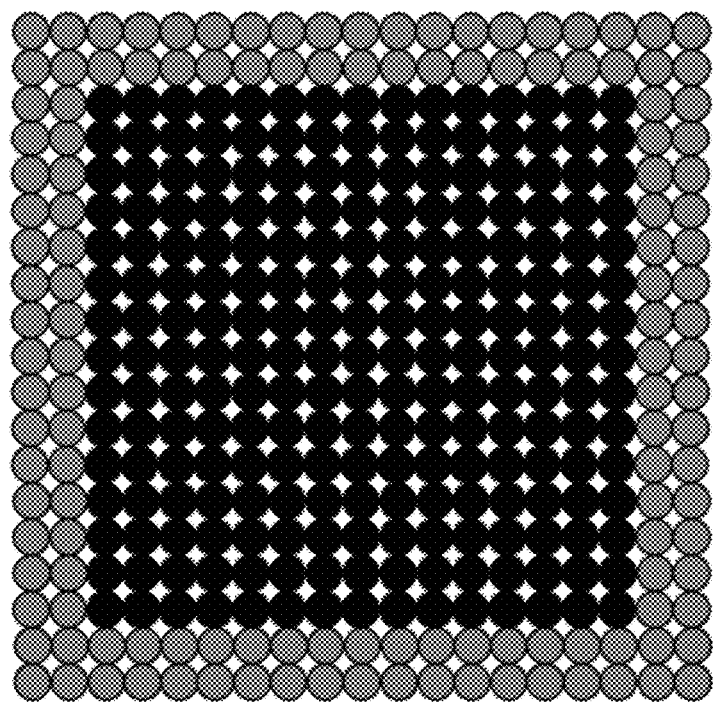
FIG. 23 shows examples of reference samples in DMVR.

For a block with size W*H, suppose the maximum allowable MVD value is +/−offset (for example 2 in VVC), and the filter size is filterSize (for example, 8 for luma and 4 for chroma in VVC), then (W+2*offSet+filterSize−1)*(H+2*offSet+filterSize−1) reference samples can be used. To reduce the memory bandwidth, only the center (W+filterSize−1)*(H+filterSize−1) reference samples are fetched, and the other pixels are generated by repeating the boundary of the fetched samples. Example for 8×8 block is shown in FIG. 23.

During the motion vector refinement, bilinear motion compensation is performed using these reference samples. Meanwhile, the final motion compensation is also performed using these reference samples.

2.3.6. Combined Intra and Inter Prediction

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

3. Drawbacks of Existing Implementations

DMVR and BIO do not involve the original signal during refining the motion vectors, which may result in coding blocks with inaccurate motion information. Also, DMVR and BIO sometimes employ the fractional motion vectors after the motion refinements while screen videos usually have integer motion vectors, which makes the current motion information more inaccurate and make the coding performance worse.

4. Example Techniques and Embodiments

The detailed embodiments described below should be considered as examples to explain general concepts. These embodiments should not be interpreted narrowly way. Furthermore, these embodiments can be combined in any manner.

The methods described below may be also applicable to other decoder motion information derivation technologies in addition to the DMVR and BIO mentioned below.

1. Whether and/or how to apply DMVR for a prediction unit/coding block/region may depend on a message (e.g. a flag) signaled such as in the sequence (e.g. SPS)/slice (e.g. slice header)/tile group (e.g. tile group header)/picture level (e.g. picture header)/block level (e.g. CTU or CU).
   a. In one example, a flag may be signaled to indicate whether DMVR is enabled Alternatively, furthermore, when such a flag indicates DMVR is disabled, the process of DMVR is skipped and the usage of DMVR is inferred to be disabled.
   b. In one example, the signaled message indicating whether and/or how to apply MMVD may also control the usage of other technologies, such as DMVR.
      i. For example, the flag indicating whether fractional motion vector difference (MVD) is allowed in the merge with motion vector difference (MMVD, a.k.a., UMVE) (e.g. tile_group_fpel_mmvd_enabled_flag) may also indicate whether and/or how to apply DMVR.
   c. In one example, if the tile_group_fpel_mmvd_enabled_flag indicates fractional MVD is not allowed for MMVD, the process of DMVR can be skipped.
2. Whether and/or how to apply BIO for a prediction unit/coding block/region may depend on a message (e.g. a flag) signaled such as in the sequence (e.g. SPS)/slice (e.g. slice header)/tile group (e.g. tile group header)/picture level (e.g. picture header)/block level (e.g. CTU or CU).
   a. In one example, a flag is signaled to indicate whether BIO is enabled Alternatively, furthermore, when such a flag indicates BIO is disabled, the process of BIO is skipped and the BIO is inferred to be disabled.
   b. In one example, the signaled message indicating whether and/or how to apply MMVD may also control the usage of other technologies, such as BIO.
      1. For example, the flag indicating whether fractional motion vector difference (MVD) is allowed in the merge with motion vector difference (MMVD, a.k.a., UMVE) (e.g. tile_group_fpel_mmvd_enabled_flag) may also indicate whether and/or how to apply BIO.
   c. In one example, if the tile_group_fpel_mmvd_enabled_flag indicates fractional MVD is not allowed for MMVD, the process of BIO can be skipped.
3. Enabling or disabling the DMVR process for a prediction unit/coding block/region may be determined based on the initial motion vectors (i.e., the decoded motion vectors before applying DMVR) and/or reference pictures.
   a. In one example, when both of the initial motion vectors are integer motion vectors, the usage of DMVR may be disabled.
   b. In one example, DMVR is always disabled when the reference picture is not pointing to certain pictures, such as when reference picture indices are not equal to 0.
   c. In one example, when the magnitudes of the initial motion vectors are larger than T, the usage of DMVR may be disabled.
      i. In one example, the definition of "magnitudes of one motion vector being larger than T" is mv.x>T and/or mv.y>T where mv.x is the magnitude of the horizontal component of the motion vector and mv.y is the magnitude of the vertical component of the current motion vector respectively.
      ii. In one example, the definition of "magnitudes of one motion vector being larger than T" is the summation of mv.x and mv.y is larger than T where mv.x is the magnitude of the horizontal component of the motion vector and mv.y is the magnitude of the vertical component of the current motion vector respectively.
      iii. Alternatively, furthermore, the usage of DMVR may be disabled when the magnitudes of the initial motion vectors are larger than T or/and the initial motion vector is an integer motion vector. T may be based on:
         a) Current block dimension
         b) Current quantization parameter
         c) The magnitudes of initial motion vectors
         d) The magnitudes of motion vectors of neighboring blocks
         e) Alternatively, T may be signaled from the encoder to the decoder.
4. Enabling or disabling the BIO process for a prediction unit/coding block/region may be determined based on the initial motion vectors (i.e., motion vectors before applying BIO) and/or reference pictures.
   a. In one example, when both of the initial motion vectors are integer motion vectors, the usage of BIO may be disabled.
   b. Alternatively, Enabling or disabling the BIO process for a prediction unit/coding block/region may be determined based on the motion vector difference between the initial motion vector and refined motion vector. In one example, when such motion vector differences are sub-pel, the updating of prediction samples/reconstruction samples is skipped.
c. In one example, BIO is always disabled when the reference picture is not pointing to certain pictures, such as when reference picture indices are not equal to 0.
d. In one example, when the magnitudes of the initial motion vectors are larger than T, the usage of BIO may be disabled.
  i. In one example, the definition of "magnitudes of one motion vector being larger than T" is mv.x>T and/or mv.y>T where mv.x is the magnitude of the horizontal component of the motion vector and mv.y is the magnitude of the vertical component of the current motion vector respectively.
  ii. In one example, the definition of "magnitudes of one motion vector being larger than T" is the summation of mv.x and mv.y is larger than T where mv.x is the magnitude of the horizontal component of the motion vector and mv.y is the magnitude of the vertical component of the current motion vector respectively.
  iii. Alternatively, furthermore, the usage of BIO may be disabled when the magnitudes of the initial motion vectors are larger than T or/and the initial motion vector is an integer motion vector. T may be based on:
    a) Current block dimension
    b) Current quantization parameter
    c) The magnitudes of initial motion vectors
    d) The magnitudes of motion vectors of neighboring blocks
    e) Alternatively, T may be signaled from the encoder to the decoder.
5. Enabling or disabling the second step in DMVR for a prediction unit/coding block/region may be determined based on a message (e.g. a flag) signaled such as in the sequence (e.g. SPS)/slice (e.g. slice header)/tile group (e.g. tile group header)/picture level (e.g. picture header)./block level (e.g. CTU or CU).
  a. In one example, a flag is signaled to indicate whether to apply the second step in DMVR.
    i. In one example, when such a flag (etc. tile_group_subpixel_refinement_enabled_flag) indicates the second step in DMVR is disabled, the process of the fractional refinement in DMVR is skipped.
  b. In one example, the signaled flag indicating enabling or disabling the second step in DMVR may also indicate information not related to the second step in DMVR.
    i. In one example, the flag indicating whether fractional motion vector difference (MVD) is allowed in the merge with motion vector difference (MMVD, a.k.a., UMVE), e.g. tile_group_fpel_mmvd_enabled_flag, may also indicate whether to apply the second step in DMVR.
    ii. In one example, if the tile_group_fpel_mmvd_enabled_flag indicates fractional MVD is disabled, the second step in DMVR is skipped.
    iii. In one example, the flag indicating whether fractional motion vector difference (MVD) is allowed in the merge with motion vector difference (MMVD, a.k.a., UMVE), e.g. tile_group_fpel_mmvd_enabled_flag, may also indicate whether to apply the second step in DMVR
6. Enabling or disabling the second step in DMVR for a prediction unit/coding block/region may be determined based on the results of integer motion refinement in DMVR
  c. In one example, when the initial motion vector is not changed after the integer motion refinement in DMVR, the usage of the second step in DMVR may be disabled.
  d. In one example, the magnitude of fractional motion vector may be allowed to be larger than half pixel, where the magnitude of fractional motion vector may be constrained to be smaller than or equal to T pixel.
    i. In one example, T>=0 and T is a float number. (e.g. T=1.5).
    ii. In one example, the definition of "magnitudes of one motion vector being smaller than T" is mv.x<T and/or mv.y<T where mv.x is the magnitude of the horizontal component of the motion vector and mv.y is the magnitude of the vertical component of the current motion vector respectively.
    iii. In one example, the definition of "magnitudes of one motion vector being smaller than T" is the summation of mv.x and mv.y is smaller than T where mv.x is the magnitude of the horizontal component of the motion vector and mv.y is the magnitude of the vertical component of the current motion vector respectively.
    iv. Alternatively, furthermore, the magnitude of fractional motion vector may be allowed to be larger than half pixel when the magnitudes of the fractional motion vector is smaller than T. T may be based on:
      a) Current block dimension
      b) Current quantization parameter
      c) The magnitudes of initial motion vectors
      d) The magnitudes of motion vectors of neighboring blocks
      e) Alternatively, T may be signaled from the encoder to the decoder.
  e. In one example, when the distance between initial motion vector and the motion vector obtained the integer motion refinement in DMVR is smaller than T, the second step in DMVR may be disabled.
    i. In one example, the definition of "magnitudes of one motion vector being smaller than T" is mv.x<T and/or mv.y<T where mv.x is the magnitude of the horizontal component of the motion vector and mv.y is the magnitude of the vertical component of the current motion vector respectively.
    ii. In one example, the definition of "magnitudes of one motion vector being smaller than T" is the summation of mv.x and mv.y is smaller than T where mv.x is the magnitude of the horizontal component of the motion vector and mv.y is the magnitude of the vertical component of the current motion vector respectively.
    iii. Alternatively, furthermore, the second step in DMVR may be disabled when the distance between initial motion vector and the motion vector obtained the integer motion refinement in DMVR is smaller than T. T may be based on:
      a) Current block dimension
      b) Current quantization parameter
      c) The magnitudes of initial motion vectors d) The magnitudes of motion vectors of neighboring blocks
e) Alternatively, T may be signaled from the encoder to the decoder.
7. Enabling or disabling the second step in DMVR for a prediction unit/coding block/region may be determined based on the initial motion vector in DMVR
   a. In one example, when both of the initial motion vectors are integer motion vectors, the usage of the second step in DMVR may be disabled.
   b. In one example, the second step in DMVR is always disabled when the reference picture is not pointing to certain pictures, such as when reference picture indices are not equal to 0.
   c. In one example, when the magnitudes of the initial motion vectors are larger than T, the usage of the second step in DMVR may be disabled.
      i. In one example, the definition of "magnitudes of one motion vector being larger than T" is mv.x>T and/or mv.y>T where mv.x is the magnitude of the horizontal component of the motion vector and mv.y is the magnitude of the vertical component of the current motion vector respectively.
      ii. In one example, the definition of "magnitudes of one motion vector being larger than T" is the summation of mv.x and mv.y is larger than T where mv.x is the magnitude of the horizontal component of the motion vector and mv.y is the magnitude of the vertical component of the current motion vector respectively.
      iii. Alternatively, furthermore, the second step in DMVR may be disabled when the magnitudes of the initial motion vectors are larger than T or/and the initial motion vector is an integer motion vector. T may be based on:
         a) Current block dimension
         b) Current quantization parameter
         c) The magnitudes of initial motion vectors
         d) The magnitudes of motion vectors of neighboring blocks
         e) Alternatively, T may be signaled from the encoder to the decoder.
8. The precision of the initial motion vector in DMVR may be determined based on a message signaled in signaled such as in the sequence (e.g. SPS)/slice (e.g. slice header)/tile group (e.g. tile group header)/picture level (e.g. picture header)./block level (e.g. CTU or CU).
   f. In one example, a flag is signaled to indicate whether the initial motion vector in DMVR is rounded to integer motion vector.
   g. In one example, the signaled flag indicating whether the initial motion vector in DMVR is rounded to integer motion vector may also indicate information not related to initial motion vector in DMVR.
      i. In one example, the flag indicating whether fractional motion vector difference (MVD) is allowed in the merge with motion vector difference (MMVD, a.k.a., UMVE) e.g. tile_group_fpel_mmvd_enabled_flag, may also indicate whether the initial motion vector in BIO and/or DMVR is rounded to integer motion vector.
9. The precision of the initial motion vector in BIO may depend on a message signaled in signaled such as in the sequence (e.g. SPS)/slice (e.g. slice header)/tile group (e.g. tile group header)/picture level (e.g. picture header)./block level (e.g. CTU or CU).
   h. In one example, a flag is signaled to indicate whether the initial motion vector in BIO is rounded to integer motion vector.
   i. In one example, the signaled flag indicating whether the initial motion vector in BIO is rounded to integer motion vector may also indicate information not related to initial motion vector in BIO.
      i. In one example, the flag indicating whether fractional motion vector difference (MVD) is allowed in the merge with motion vector difference (MMVD, a.k.a., UMVE) e.g., tile_group_fpel_mmvd_enabled_flag, may also indicate whether the initial motion vector in BIO and/or DMVR is rounded to integer motion vector.
10. Which MVD candidates (such as those used in the first step and/or second step) may be adaptively changed based on precision of initialized motion vectors.
   j. In one example, when the initialized motion vectors are sub-pel motion vectors, checking of a temporary motion vector (derived from initialized motion vector and one MVD candidate) may be skipped if it is an integer-pel motion vector.
   k. Alternatively, when the initialized motion vectors are sub-pel motion vectors, checking of a temporary motion vector (derived from initialized motion vector and one MVD candidate) may be skipped if it is a sub-pel motion vector.

5. Additional Embodiments

Text changes in the VVC draft are shown in underlined bold italicized font in the tables below.

7.3.2. Raw Byte Sequence Payloads, Trailing Bits and Byte Alignment Syntax 7.3.2.1. Sequence Parameter Set RBSP Syntax

|  | Descriptor |
|---|---|
| seq_parameter_set_rbsp( ) { |  |
|   sps_seq_parameter_set_id | ue(v) |
| ... |  |
|   sps_sbt_enabled_flag | u(1) |
|   if( sps_sbt_enabled_flag ) |  |
|     sps_sbt_max_size_64_flag | u(1) |
|   sps_affine_enabled_flag | u(1) |
|   if( sps_affine_enabled_flag ) |  |
|     sps_affine_type_flag | u(1) |
|   sps_gbi_enabled_flag | u(1) |
|   sps_ibc_enabled_flag | u(1) |
|   sps_ciip_enabled_flag | u(1) |
|   sps_fpel_mmvd_enabled_flag | u(1) |
|   *sps_subpixel_refinement_enabled_flag* | *u(1)* |
|   sps_triangle_enabled_flag | u(1) |
|   sps_ladf_enabled_flag | u(1) |
|   if ( sps_ladf_enabled_flag ) { |  |
|     sps_num_ladf_intervals_minus2 | u(2) |
| ... |  |
| } |  |

|  | Descriptor |
|---|---|
| seq_parameter_set_rbsp( ) { |  |
|   sps_seq_parameter_set_id | ue(v) |
| ... |  |
|   sps_ref_wraparound_enabled_flag | u(1) |

-continued

| | Descriptor |
|---|---|
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_affine_amvr_enabled_flag | u(1) |
| sps_dmvr_enabled_flag | u(1) |
| *sps_subpixel_refinement_enabled_flag* | u(1) |
| sps_cclm_enabled_flag | u(1) |
| if( sps_cclm_enabled_flag && chroma_format_idc == 1 ) | |
|   sps_cclm_colocated_chroma_flag | u(1) |
| sps_mts_enabled_flag | u(1) |
|   sps_num_ladf_intervals_minus2 | u(2) |
| ... | |
| } | |

| | Descriptor |
|---|---|
| seq_parameter_set_rbsp( ) { | |
|   sps_seq_parameter_set_id | ue(v) |
| ... | |
|   sps_ref_wraparound_enabled_flag | u(1) |
|   if( sps_ref_wraparound_enabled_flag ) | |
|     sps_ref_wraparound_offset_minus1 | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_affine_amvr_enabled_flag | u(1) |
|   sps_dmvr_enabled_flag | u(1) |
|   *if(sps_dmvr_enabled_flag)* | |
|     *sps_subpixel_refinement_enabled_flag* | u(1) |
|   sps_cclm_enabled_flag | u(1) |
|   if( sps_cclm_enabled_flag && chroma_format_idc == 1 ) | |
|     sps_cclm_colocated_chroma_flag | u(1) |
|   sps_mts_enabled_flag | u(1) |
|     sps_num_ladf_intervals_minus2 | u(2) |
| ... | |
| } | | sps_subpixel_refinement_enabled_flag equal to 1 specifies that the adaptive sub pixel MVD refinement can be used in a tile. sps_fpel_mmvd_enabled_flag specifies that the adaptive sub pixel MVD refinement cannots be used in a tile.

7.3.4. Tile Group Header Syntax

7.3.4.1. General Tile Group Header Syntax

| | Descriptor |
|---|---|
| tile_group_header( ) { | |
| ... | |
|   if ( tile_group_type != I ) { | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     if( ( weighted_pred_flag && tile_group_type == P ) \|\| | |
|       ( weighted_bipred_flag && tile_group == B ) ) | |
|       pred_weight_table( ) | |

-continued

| | Descriptor |
|---|---|
|     six_minus_max_num_merge_cand | ue(v) |
|     if( sps_affine_enabled_flag ) | |
|       five_minus_max_num_subblock_merge_cand | ue(v) |
|     if( sps_fpel_mmvd_enabled_flag ) | |
|       tile_group_fpel_mmvd_enabled_flag | u(1) |
|     *if(sps_subpixel_refinement_enabled_flag)* | |
|       *tile_group_subpixel_refinement_enabled_flag* | *u(1)* |
|   } else if ( sps_ibc_enabled_flag ) | |
|     six_minus_max_num_merge_cand | ue(v) |
|   tile_group_qp_delta | se(v) |
|   if( pps_tile_group_chroma_qp_offsets_present_flag ) { | |
|     tile_group_cb_qp_offset | se(v) |
|     tile_group_cr_qp_offset | se(v) |
|   } | |
|   if( sps_sao_enabled_flag ) { | |
|     tile_group_sao_luma_flag | u(1) |
|     if( ChromaArrayType != 0) | |
|       tile_group_sao_chroma_flag | u(1) |
|   } | |
|   if( sps_alf_enabled_flag ) { | |
|     tile_group_alf_enabled_flag | u(1) |
|     if( tile_group_alf_enabled_flag ) | |
|       tile_group_aps_id | u(5) |
|   } | |
|   dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     tile_group_deblocking_filter_disabled_flag | u(1) |
|     if( !tile_group_deblocking_filter_disabled_flag ) { | |
|       tile_group_beta_offset_div2 | se(v) |
|       tile_group_tc_offset_div2 | se(v) |
|     } | |
|   } | |
|   if( NumTilesInCurrTileGroup > 1 ) { | |
|     offset_len_minus1 | ue(v) |
|     for( i = 0; i < NumTilesInCurrTileGroup − 1; i++ ) | |
|       entry_point_offset_minus1[ i ] | u(v) |
|   } | |
|   byte_alignment( ) | |
| } | |

| | Descriptor |
|---|---|
| tile_group_header( ) { | |
| ... | |
|   if ( tile_group_type != I ) { | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     if( ( weighted_pred_flag && tile_group_type == P ) \|\| | |
|       ( weighted_bipred_flag && tile_group == B ) ) | |
|       pred_weight_table( ) | |
|     six_minus_max_num_merge_cand | ue(v) |
|     if( sps_affine_enabled_flag ) | |
|       five_minus_max_num_subblock_merge_cand | ue(v) |
|     if( sps_fpel_mmvd_enabled_flag ) | |
|       tile_group_fpel_mmvd_enabled_flag | u(1) |
|     *tile_group_subpixel_refinement_enabled_flag* | *u(1)* |
|   } else if ( sps_ibc_enabled_flag ) | |
|     six_minus_max_num_merge_cand | ue(v) |
|   tile_group_qp_delta | se(v) |
|   if( pps_tile_group_chroma_qp_offsets_present_flag ) { | |
|     tile_group_cb_qp_offset | se(v) |
|     tile_group_cr_qp_offset | se(v) |
|   } | |

| | Descriptor |
|---|---|
| if( sps_sao_enabled_flag ) { | |
|     tile_group_sao_luma_flag | u(1) |
|     if( ChromaArrayType != 0) | |
|         tile_group_sao_chroma_flag | u(1) |
| } | |
| if( sps_alf_enabled_flag ) { | |
|     tile_group_alf_enabled_flag | u(1) |
|     if( tile_group_alf_enabled_flag ) | |
|         tile_group_aps_id | u(5) |
| } | |
| dep_quant_enabled_flag | u(1) |
| if( !dep_quant_enabled_flag ) | |
|     sign_data_hiding_enabled_flag | u(1) |
| if( deblocking_filter_override_enabled_flag ) | |
|     deblocking_filter_override_flag | u(1) |
| if( deblocking_filter_override_flag ) { | |
|     tile_group_deblocking_filter_disabled_flag | u(1) |
|     if( !tile_group_deblocking_filter_disabled_flag ) { | |
|         tile_group_beta_offset_div2 | se(v) |
|         tile_group_tc_offset_div2 | se(v) |
|     } | |
| } | |
| if( NumTilesInCurrTileGroup > 1 ) { | |
|     offset_len_minus1 | ue(v) |
|     for( i = 0; i < NumTilesInCurrTileGroup − 1; i++ ) | |
|         entry_point_offset_minus1[ i ] | u(v) |
| } | |
| byte_alignment( ) | |
| } | |

| | Descriptor |
|---|---|
| tile_group_header( ) { | |
| ... | |
|   if ( tile_group_type != I ) { | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     if( ( weighted_pred_flag && tile_group_type == P ) \|\| ( weighted_bipred_flag && tile_group == B ) ) | |
|       pred_weight_table( ) | |
|     six_minus_max_num_merge_cand | ue(v) |
|     if( sps_affine_enabled_flag ) | |
|       five_minus_max_num_subblock_merge_cand | ue(v) |
|     if( sps_fpel_mmvd_enabled_flag ) | |
|       tile_group_fpel_mmvd_enabled_flag | u(1) |
|     *if(sps_dmvr_enabled_flag)* | |
|       *tile_group_subpixel_refinement_enabled_flag* | *u(1)* |
|   } else if ( sps_ibc_enabled_flag ) | |
|     six_minus_max_num_merge_cand | ue(v) |
|   tile_group_qp_delta | se(v) |
|   if( pps_tile_group_chroma_qp_offsets_present_flag ) { | |
|     tile_group_cb_qp_offset | se(v) |
|     tile_group_cr_qp_offset | se(v) |
|   } | |
|   if( sps_sao_enabled_flag ) { | |
|     tile_group_sao_luma_flag | u(1) |
|     if( ChromaArrayType != 0 ) | |
|       tile_group_sao_chroma_flag | u(1) |
|   } | |
|   if( sps_alf_enabled_flag ) { | |
|     tile_group_alf_enabled_flag | u(1) |
|     if( tile_group_alf_enabled_flag ) | |
|       tile_group_aps_id | u(5) |
|   } | |
|   dep_quant_enabled_flag | u(1) |
|   if( !dep_quant_enabled_flag ) | |

| | Descriptor |
|---|---|
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     tile_group_deblocking_filter_disabled_flag | u(1) |
|     if( !tile_group_deblocking_filter_disabled_flag ) { | |
|       tile_group_beta_offset_div2 | se(v) |
|       tile_group_tc_offset_div2 | se(v) |
|     } | |
|   } | |
|   if( NumTilesInCurrTileGroup > 1 ) { | |
|     offset_len_minus1 | ue(v) |
|     for( i = 0; i < NumTilesInCurrTileGroup − 1; i++ ) | |
|       entry_point_offset_minus1[ i ] | u(v) |
|   } | |
|   byte_alignment( ) | |
| } | | tile_group_subpixel_refinement_enabled_flag equal to 1 specifies the sub pixel MVD refinement can be enabled in current tile group. tile_group_fpel_mmvd_enabled_flag equal to 0 specifies that sub pixel MVD refinement cannot be enabled in current tile group. When not present, the value of tile_group_fpel_mmvd_enabled_flag is inferred to be 1.

8.5.3. Decoder Side Motion Vector Refinement Process

8.5.3.1. General

Inputs to this process are:
a luma location (xSb, ySb) specifying the top-left sample of the current coding subblock relative to the top left luma sample of the current picture,
a variable sbWidth specifying the width of the current coding subblock in luma samples,
a variable sbHeight specifying the height of the current coding subblock in luma samples,
the luma motion vectors in 1/16 fractional-sample accuracy mvL0 and mvL1,
the selected luma reference picture sample arrays refPicL0L and refPicL1L.
Outputs of this process are:
delta luma motion vectors dMvL0 and dMvL1.
The variable subPelFlag is set to 0. and the variables srRange, offsetH0, offsetH1, offsetV0, and offsetV1 are all set equal to 2.
Both components of the delta luma motion vectors dMvL0 and dMvL1 are set equal to zero and modified as follows:
For each X being 0 or 1, the (sbWidth+2*srRange)× (sbHeight+2*srRange) array predSamplesLX$_L$ of prediction luma sample values is derived by invoking the fractional sample bilinear interpolation process specified in 8.5.3.2.1 with the luma location (xSb, ySb), the prediction block width set equal to (sbWidth+2*srRange), the prediction block height set equal to (sbHeight+2*srRange), the reference picture sample array refPicLX$_L$, the motion vector mvLX and the refinement search range srRange as inputs.
The list sadList[i] with i=0 . . . 8 is derived by invoking the sum of absolute differences calculation process specified in 8.5.3.3 with sbWidth, sbHeight, offsetH0, offsetH1, offsetV0, offsetV1, predSamplesL0$_L$ and predSamplesL1$_L$ as inputs.

When sadList[4] is greater than or equal to sbHeight*sbWidth, the following applies:
  The variable bestIdx is derived by invoking the array entry selection process specified in clause 8.5.3.4 with the list sadList[i] with i=0 . . . 8 as input.
  If bestIdx is equal to 4, subPelFlag is set equal to 1.
  Otherwise, the following applies:

$dX = bestIdx \% 3 - 1$ $dY = bestIdx/3 - 1$ $dMvL0[0] += 16*dX$ $dMvL0[1] += 16*dY$ $offsetH0 += dX$ $offsetV0 += dY$ $offsetH1 -= dX$ $offsetV1 -= dY$ The list sadList[i] with i=0 . . . 8 is modified by invoking the sum of absolute differences calculation process specified in 8.5.3.3 with sbWidth, sbHeight, offsetH0, offsetH1, offsetV0, offsetV1, predSamplesL0$_L$ and predSamplesL0$_L$ as inputs.
The variable bestIdx is modified by invoking the array entry selection process specified in clause 8.5.3.4 with the list sadList[i] with i=0 . . . 8 as input.
If bestIdx is equal to 4, subPelFlag is set equal to 1
Otherwise (bestIdx is not equal to 4), the following applies:

$dMvL0[0] += 16*(bestIdx \% 3 - 1)$ $dMvL0[1] += 16*(bestIdx/3 - 1)$

If tile_group_subpixel_refinement_enabled_flag is equal to 1
  When subPelFlag is equal to 1, the parametric motion vector refinement process specified in clause 8.5.3.5 is invoked with the list sadList[i] with i=0 . . . 8, and the delta motion vector dMvL0 as inputs and the modified dMvL0 as output.
The delta motion vector dMvL1 is derived as follows:

$dMvL1[0] = -dMvL0[0]$ $dMvL1[1] = -dMvL0[1]$

9. Example Implementations of the Disclosed Technology

Figure 24:
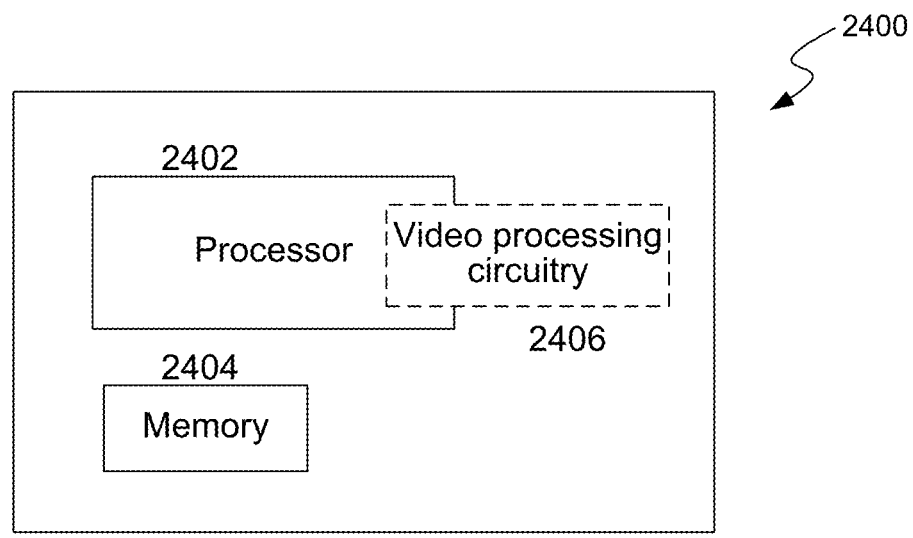
FIG. 24 is a block diagram of an example of a hardware platform for implementing a visual media decoding or a visual media encoding technique described in the present document.

FIG. 24 is a block diagram of a video processing apparatus 2400. The apparatus 2400 may be used to implement one or more of the methods described herein. The apparatus 2400 may be embodied in a smartphone, tablet, computer, Internet of Things (IoT) receiver, and so on. The apparatus 2400 may include one or more processors 2402, one or more memories 2404 and video processing hardware 2406. The processor(s) 2402 may be configured to implement one or more methods described in the present document. The memory (memories) 2404 may be used for storing data and code used for implementing the methods and techniques described herein. The video processing hardware 2406 may be used to implement, in hardware circuitry, some techniques described in the present document, and may be partly or completely be a part of the processors 2402 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 25:
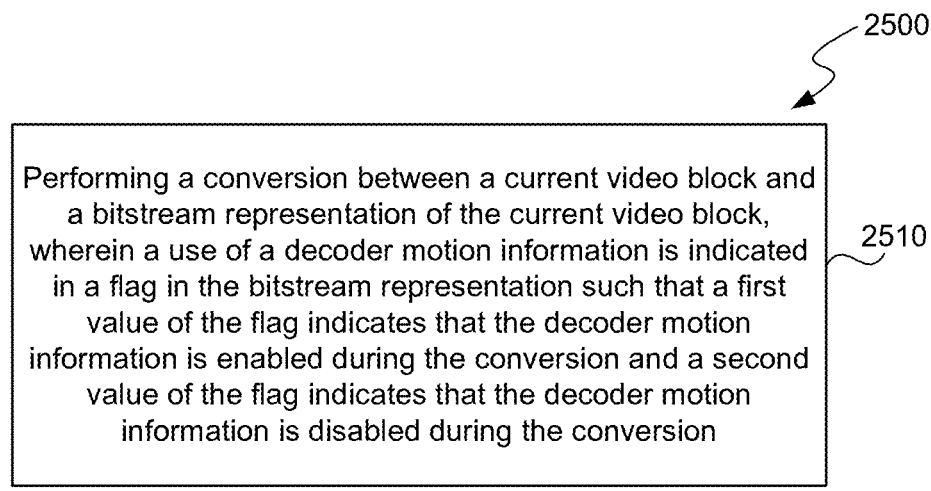
FIG. 25 shows a flowchart of an example method for video coding.

FIG. 25 is a flowchart for an example method 2500 of video processing. The method 2500 includes, at 2510, performing a conversion between a current video block and a bitstream representation of the current video block, wherein a use of a decoder motion information is indicated in a flag in the bitstream representation such that a first value of the flag indicates that the decoder motion information is enabled during the conversion and a second value of the flag indicates that the decoder motion information is disabled during the conversion.

Some embodiments may be described using the following clause-based format.

1. A method of visual media processing, comprising:
  performing a conversion between a current video block and a bitstream representation of the current video block, wherein a use of a decoder motion information is indicated in a flag in the bitstream representation such that a first value of the flag indicates that the decoder motion information is enabled during the conversion and a second value of the flag indicates that the decoder motion information is disabled during the conversion.

2. The method of clause 1, wherein the decoder motion information includes a decoder motion video refinement (DMVR) or a bi-directional optical (BIO) flow.

3. The method of any of clauses 1-2, wherein the flag is denoted as tile_group_fpel_mmvd_enabled_flag.

4. The method of any of clauses 1-3, wherein the flag indicates whether fractional motion vector difference (MVD) is allowed in a merge with motion vector difference (MMVD) mode.

5. The method of any of clauses 1-3, wherein the flag indicates whether fractional motion vector difference (MVD) is unallowed in a merge with motion vector difference (MMVD) mode.

6. The method of clause 2, wherein the decoder motion information derivation includes at least one of: one or more initial motion vectors associated with the video block or one or more reference pictures associated with the video block, wherein the one or more initial motion vectors are decoded motion vectors before the use of the DMVR or the BIO.

7. The method of clause 6, wherein the one or more initial motion vectors associated with the video block includes two initial motion vectors, further comprising:
  in response to determining that both the two initial motion vectors are integer valued, skipping the DMVR.

8. The method of clause 6, further comprising:
in response to determining that indices of the one or more reference pictures associated with the video block are non-zero, skipping the DMVR.

9. The method of clause 6, further comprising:
in response to determining that magnitudes of the one or more initial motion vectors associated with the video block are greater than a threshold value, skipping the DMVR.

10. The method of clause 9, wherein the magnitudes of the one or more initial motion vectors associated with the video block include a magnitude of a horizontal component of a motion vector (denoted mv.x) and a magnitude of a vertical component of the motion vector (denoted mv.y), wherein the motion vector is included in the one or more initial motion vectors, wherein mv.x>T and/or mv.y>T, and wherein T denotes the threshold value.

11. The method of clause 9, wherein the magnitudes of the one or more initial motion vectors associated with the video block include a magnitude of a horizontal component of a motion vector (denoted mv.x) and a magnitude of a vertical component of the motion vector (denoted mv.y), wherein the motion vector is included in the one or more initial motion vectors, wherein sum(mv.x, mv.y)>T, wherein T denotes the threshold value, and wherein sum(x,y)=x+y.

12. The method of any of clauses 10-11, wherein the motion vector is a motion vector of a current video block.

13. The method of any of clauses 10-12, wherein the threshold value is based on one or more of: a dimension of the video block, a quantization parameter, the magnitudes of the one or more initial motion vectors associated with the video block, magnitudes of motion vectors associated with blocks neighboring the video block, or a value signaled from the visual media processing encoder to the visual media processing decoder.

14. The method of clause 6, wherein the one or more initial motion vectors associated with the video block includes two initial motion vectors, further comprising:
in response to determining that both the two initial motion vectors are integer valued, skipping the BIO.

15. The method of clause 6, wherein the one or more initial motion vectors associated with the video block includes an initial motion vector and a refinement of the initial motion vector, further comprising:
based on calculating a difference of the initial motion vector and the refinement, enabling or skipping the BIO.

16. The method of clause 15, further comprising:
in response to determining that the difference of the initial motion vector and the refinement are sub pixel, skipping predictions associated with the video block.

17. The method of clause 6, further comprising:
in response to determining that indices of the one or more reference pictures associated with the video block are non-zero, skipping the BIO.

18. The method of clause 6, further comprising:
in response to determining that magnitudes of the one or more initial motion vectors associated with the video block are greater than a threshold value, skipping the BIO.

19. The method of clause 18, wherein the magnitudes of the one or more initial motion vectors associated with the video block include a magnitude of a horizontal component of a motion vector (denoted mv.x) and a magnitude of a vertical component of the motion vector (denoted mv.y), wherein the motion vector is included in the one or more initial motion vectors, wherein mv.x>T and/or mv.y>T, and wherein T denotes the threshold value.

20. The method of clause 18, wherein the magnitudes of the one or more initial motion vectors associated with the video block include a magnitude of a horizontal component of a motion vector (denoted mv.x) and a magnitude of a vertical component of the motion vector (denoted mv.y), wherein the motion vector is included in the one or more initial motion vectors, wherein sum(mv.x, mv.y)>T, wherein T denotes the threshold value, and wherein sum(x,y)=x+y.

21. The method of any of clauses 19-20, wherein the motion vector is a motion vector of a current video block.

22. The method of any of clauses 19-20, wherein the threshold value is based on one or more of: a dimension of the video block, a quantization parameter, the magnitudes of the one or more initial motion vectors associated with the video block, magnitudes of motion vectors associated with blocks neighboring the video block, or a value signaled from the visual media processing encoder to the visual media processing decoder.

23. The method of any of clauses 1-2, wherein the DMVR includes a second step of fractional refinement, wherein the flag indicates whether or not the fractional refinement is skipped.

24. The method of clause 23, wherein the flag is denoted tile_group_subpixel_refinement_enabled_flag.

25. The method of clause 23, wherein the flag indicates information unrelated to the second step of fractional refinement.

26. The method of clause 25, wherein the flag indicates whether fractional motion vector difference (MVD) is allowed in a merge with motion vector difference (MMVD) mode.

27. The method of clause 26, wherein the flag is denoted tile_group_fpel_mmvd_enabled_flag.

28. The method of clause 25, wherein if the flag indicates whether fractional motion vector difference (MVD) is disabled, the second step of fractional refinement is skipped.

29. The method of clause 26, wherein the flag is denoted tile_group_fpel_mmvd_enabled_flag.

30. The method of any of clauses 1-2, wherein the DMVR includes a second step of fractional refinement based on results of an integer motion refinement.

31. The method of clause 30, further comprising:
in response to determining that an initial motion vector of the video block is unchanged after the integer motion refinement, skipping the second step of the DMVR.

32. The method of clause 31, wherein a magnitude of fractional motion vector is greater than half a pixel, and wherein the magnitude of the fractional motion vector is constrained to be less than or equal to a threshold value.

33. The method of clause 31, wherein the threshold value is a non-zero floating number.

34. The method of clause 32, wherein the magnitude of the fractional motion vector associated with the video block includes a magnitude of a horizontal component of the fractional motion vector (denoted mv.x) and a magnitude of a vertical component of the fractional motion vector (denoted mv.y), and wherein mv.x<T and/or mv.y<T, and wherein T denotes the threshold value.

35. The method of clause 32, wherein the magnitude of the fractional motion vector associated with the video block includes a magnitude of a horizontal component of the fractional motion vector (denoted mv.x) and a magnitude of a vertical component of the fractional motion vector (denoted mv.y), and wherein sum(mv.x, mv.y)<T, wherein T denotes the threshold value, and wherein sum(x,y)=x+y.

36. The method of any of clauses 32-35, wherein the threshold value is based on one or more of: a dimension of the video block, a quantization parameter, the magnitudes of the one or more initial motion vectors associated with the video block, magnitudes of motion vectors associated with blocks neighboring the video block, or a value signaled from the visual media processing encoder to the visual media processing decoder.

37. The method of clause 30, wherein a difference vector is computed as a difference between an initial motion vector of the video block and a motion vector obtained after the integer motion refinement, further comprising:
in response to determining that a magnitude of the difference vector is smaller than a threshold value, skipping the second step of the DMVR.

38. The method of clause 37, wherein the magnitude of the difference vector associated with the video block includes a magnitude of a horizontal component of the difference vector (denoted mv.x) and a magnitude of a vertical component of the difference vector (denoted mv.y), and wherein mv.x<T and/or mv.y<T, and wherein T denotes the threshold value.

39. The method of clause 37, wherein the magnitude of the difference vector associated with the video block includes a magnitude of a horizontal component of the difference vector (denoted mv.x) and a magnitude of a vertical component of the difference vector (denoted mv.y), and wherein sum(mv.x, mv.y)<T, wherein T denotes the threshold value, and wherein sum(x,y)=x+y.

40. The method of any of clauses 37-39, wherein the threshold value is based on one or more of: a dimension of the video block, a quantization parameter, the magnitudes of the one or more initial motion vectors associated with the video block, magnitudes of motion vectors associated with blocks neighboring the video block, or a value signaled from the visual media processing encoder to the visual media processing decoder.

41. The method of any of clauses 1-2, wherein the flag indicates a precision of the initial motion vector associated with the video block.

42. The method of clause 41, wherein the flag indicates whether the initial motion vector is rounded to an integer value.

43. The method of clause 42, wherein the flag indicates information unrelated to the initial motion vector.

44. The method of clause 43, wherein the flag indicates whether fractional motion vector difference (MVD) is allowed in a merge with motion vector difference (MMVD) mode.

45. The method of clause 44, wherein the flag is denoted tile_group_fpel_mmvd_enabled_flag.

46. A method of visual media processing, comprising:
performing a conversion between a current video block and a bitstream representation of the current video block, wherein a use of a decoder motion information is indicated in a flag in the bitstream representation such that a first value of the flag indicates that the decoder motion information is enabled during the conversion and a second value of the flag indicates that the decoder motion information is disabled during the conversion; and
in response to determining that an initial motion vector of the video block has sub-pixel precision, skipping checks associated with a temporary motion vector derived from the initial motion vector and a candidate motion vector difference, wherein the temporary motion vector has integer-pixel precision or sub-pixel precision.

47. The method of any one or more of clauses 1-46, wherein the flag is included in a video parameter set (VPS), a sequence parameter set (SPS), a picture parameter set (PPS), a picture header, a tile group header, a slice header, a coding tree unit row, or a region associated with a coding tree unit 48. The method of any one or more of clauses 1 through 47, wherein the visual media processing is an encoder-side implementation.

49. The method of any one or more of clauses 1 through 47, wherein the visual media processing is a decoder-side implementation.

50. An apparatus in a video system comprising a processor and a non-transitory memory with instructions thereon, wherein the instructions upon execution by the processor, cause the processor to implement the method in any one or more of clauses 1 to 49.

51. A computer program product stored on a non-transitory computer readable media, the computer program product including program code for carrying out the method in any one or more of clauses 1 to 49.

Figure 26:
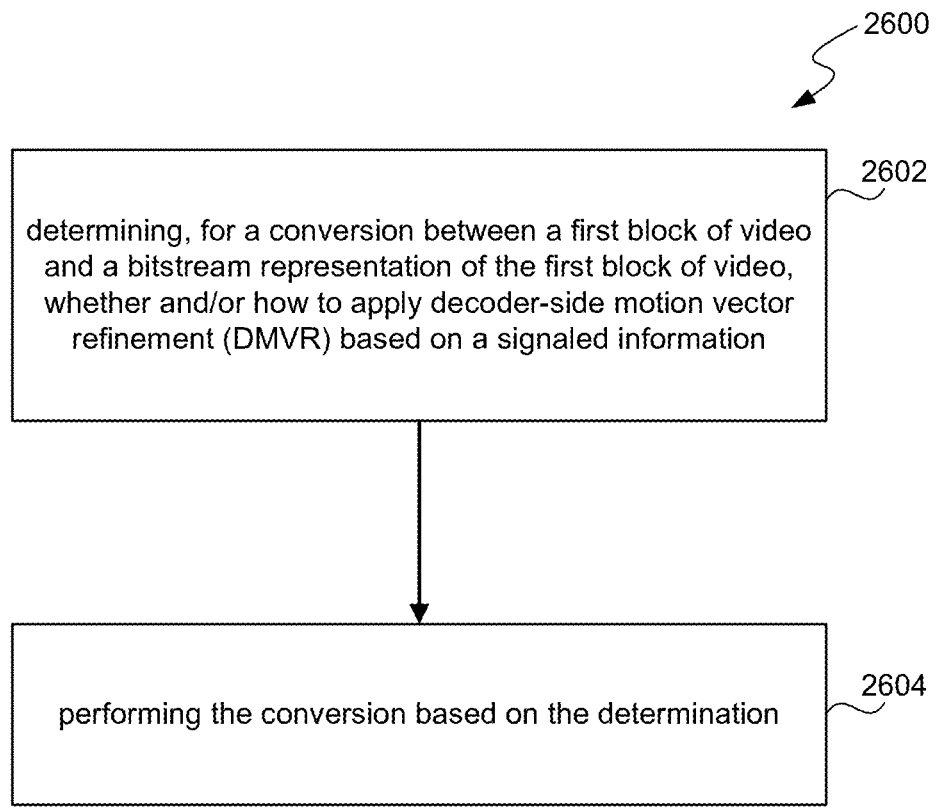
FIG. 26 shows a flowchart of an example method for video coding.

FIG. 26 is a flowchart for an example method 2600 of video processing. The method 2600 includes, at 2602, determining, for a conversion between a first block of video and a bitstream representation of the first block of video, whether and/or how to apply decoder-side motion vector refinement (DMVR) based on a signaled information; and, at 2604, performing the conversion based on the determination.

In some examples, the signaled information includes a flag present in the bitstream representation.

In some examples, the signaled information is signaled in at least one of the following: sequence level including sequence parameter set (SPS), slice level including slice header, tile group level including tile group header, picture level including picture header, and block level including coding tree unit and coding unit.

In some examples, the DMVR is applied for at least one of a prediction unit, coding block and region during the conversion.

In some examples, a flag is signaled to indicate whether DMVR is enabled or disabled.

In some examples, when the flag indicates DMVR is disabled, process of DMVR is skipped and the usage of DMVR is inferred to be disabled.

In some examples, the signaled information indicating whether and/or how to apply DMVR is used to control the usage of other decoder motion information derivation technologies.

In some examples, the other decoder motion information derivation technologies include Bi-directional Optical flow (BIO).

In some examples, the flag which indicate whether fractional motion vector difference (MVD) is allowed in a merge with motion vector difference (MMVD) mode, is used to determine whether and/or how to apply DMVR.

In some examples, the flag is tile_group_fpel_mmvd_enabled_flag.

In some examples, if the flag indicates fractional MVD is not allowed for MMVD, the process of DMVR is skipped during the conversion.

In some examples, the flag is tile_group_fpel_mmvd_enabled_flag.

In some examples, the conversion generates the first block of video from the bitstream representation.

In some examples, the conversion generates the bitstream representation from the first block of video.

Figure 27:
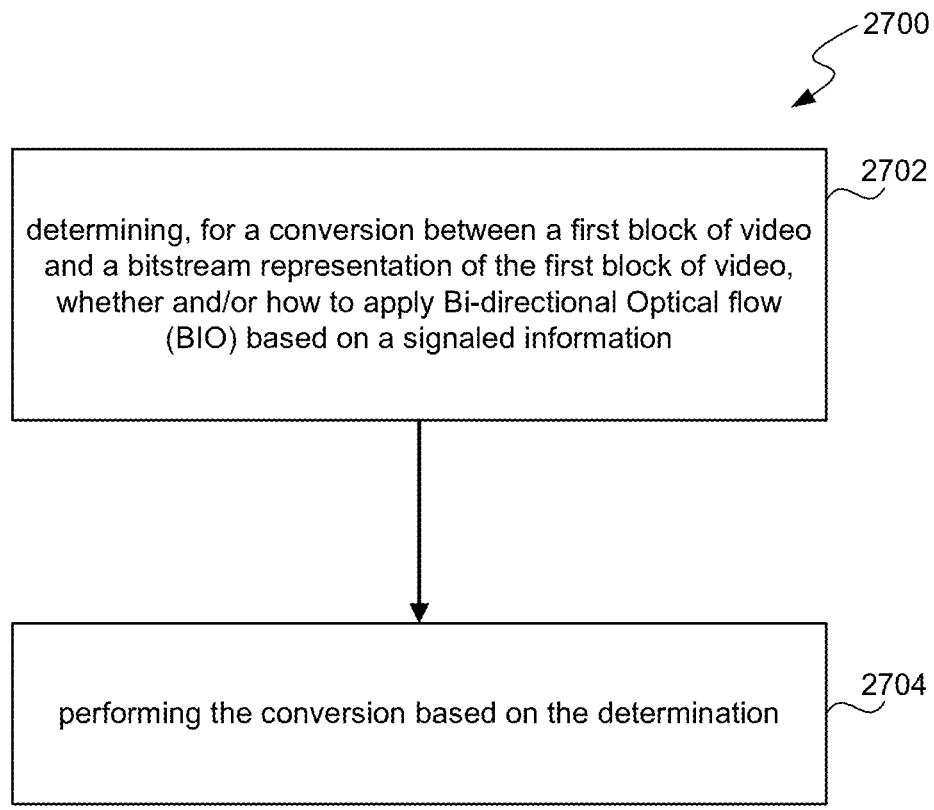
FIG. 27 shows a flowchart of an example method for video coding.

FIG. 27 is a flowchart for an example method 2700 of video processing. The method 2700 includes, at 2702, determining, for a conversion between a first block of video and a bitstream representation of the first block of video, whether and/or how to apply Bi-directional Optical flow (BIO) based on a signaled information; and, at 2704, performing the conversion based on the determination.

In some examples, the signaled information includes a flag present in the bitstream representation.

In some examples, the signaled information is signaled in at least one of the following: sequence level including sequence parameter set (SPS), slice level including slice header, tile group level including tile group header, picture level including picture header, and block level including coding tree unit and coding unit.

In some examples, the BIO is applied for at least one of a prediction unit, coding block and region during the conversion.

In some examples, a flag is signaled to indicate whether BIO is enabled or disabled.

In some examples, when the flag indicates BIO is disabled, process of BIO is skipped and the usage of BIO is inferred to be disabled.

In some examples, the signaled information indicating whether and/or how to apply BIO is used to control the usage of other decoder motion information derivation technologies.

In some examples, the other decoder motion information derivation technologies include decoder motion video refinement (DMVR).

In some examples, the flag which indicate whether fractional motion vector difference (MVD) is allowed in a merge with motion vector difference (MMVD) mode, is used to determine whether and/or how to apply BIO.

In some examples, the flag is tile_group_fpel_mmvd_enabled_flag.

In some examples, if the flag indicates fractional MVD is not allowed for MMVD, the process of BIO is skipped during the conversion.

In some examples, the falg is tile_group_fpel_mmvd_enabled_flag.

In some examples, the conversion generates the first block of video from the bitstream representation.

In some examples, the conversion generates the bitstream representation from the first block of video.

Figure 28:
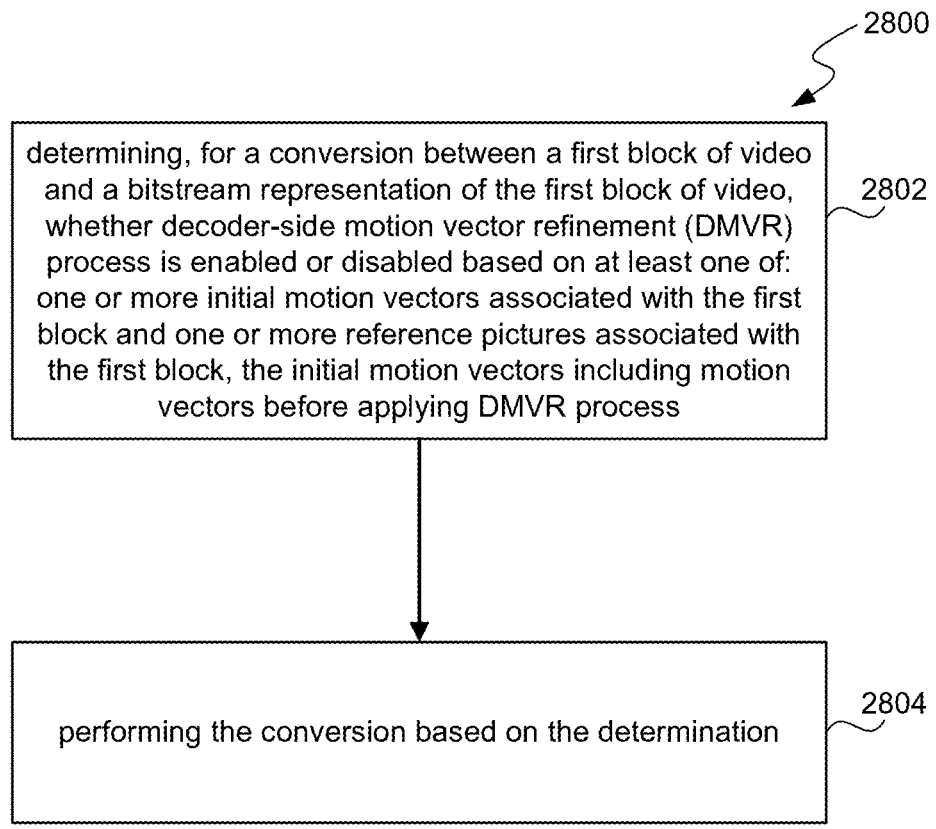
FIG. 28 shows a flowchart of an example method for video coding.

FIG. 28 is a flowchart for an example method 2800 of video processing. The method 2800 includes, at 2802, determining, for a conversion between a first block of video and a bitstream representation of the first block of video, whether decoder-side motion vector refinement (DMVR) process is enabled or disabled based on at least one of: one or more initial motion vectors associated with the first block and one or more reference pictures associated with the first block, the initial motion vectors including motion vectors before applying DMVR process; and at 2804, performing the conversion based on the determination.

In some examples, the DMVR process is applied for at least one of a prediction unit, coding block and region associated with the first block during the conversion.

In some examples, the initial motion vectors include a first initial motion vector in a first direction and/or a second initial motion vector in a second direction.

In some examples, when both of the initial motion vectors are integer motion vectors, the DMVR process is disabled.

In some examples, when the reference picture does not point to certain pictures, the DMVR process is disabled.

In some examples, when reference picture indices are not equal to 0, the DMVR process is disabled.

In some examples, when magnitudes of the one or more initial motion vectors are larger than a threshold (T), the DMVR process is disabled.

In some examples, the magnitudes of each initial motion vector include a magnitude of a horizontal component (mv.x) and a magnitude of a vertical component (mv.y).

In some examples, when one or more of the horizontal components mv.x and the vertical component mv.y of the initial motion vector are larger than the threshold T, the DMVR process is disabled.

In some examples, when summation of the horizontal component mv.x and the vertical component mv.y of the initial motion vector is larger than the threshold T, the DMVR process is disabled.

In some examples, when magnitudes of the one or more initial motion vectors are larger than a threshold (T) and/or and the initial motion vector is an integer motion vector, the DMVR process is disabled.

In some examples, T is determined based on at least one of: dimension of the first block, current quantization parameter, the magnitudes of the one or more initial motion vectors, and the magnitudes of motion vectors of neighboring blocks of the first block.

In some examples, T is signaled from encoder to decoder.

In some examples, the DMVR process includes a first step where an integer motion vector difference (MVD) refinement with integer precision is performed and a second step where a fractional MVD refinement with fractional precision is performed.

In some examples, the method further comprising: determining whether the second step of the DMVR process is enabled or disabled based on a signaled information.

In some examples, the signaled information includes a flag present in the bitstream representation.

In some examples, the signaled information is signaled in at least one of the following: sequence level including sequence parameter set (SPS), slice level including slice header, tile group level including tile group header, picture level including picture header, and block level including coding tree unit and coding unit.

In some examples, a flag is signaled to indicate whether the second step of the DMVR process is enabled or disabled.

In some examples, the flag is tile_group_subpixel_refinement_enabled_flag.

In some examples, when the flag indicates the second step of the DMVR process is disabled, the process of the fractional refinement in the DMVR process is skipped.

In some examples, the flag indicating whether the second step in the DMVR process is enabled or disabled further indicates additional information in addition to the second step in the DMVR process.

In some examples, a flag which indicates whether fractional MVD is allowed in a merge with motion vector difference (MMVD) mode, is used to indicate whether the second step of the DMVR process is enabled or disabled.

In some examples, the flag is tile_group_fpel_mmvd_enabled_flag

In some examples, the method further comprising: determining how to perform the second step of the DMVR process is based on the results of integer motion refinement in the first step of the DMVR process.

In some examples, when the initial motion vector is not changed after the integer motion refinement in the first step of the DMVR process, the second step in the DMVR process is disabled.

In some examples, the magnitude of the motion vector obtained after the second step is allowed to be larger than half pixel and smaller than or equal to a second threshold T2 pixel.

In some examples, T2>=0 and T2 is a float number.

In some examples, the magnitudes of the motion vectors include a magnitude of a horizontal component (mv.x) and a magnitude of a vertical component (mv.y).

In some examples, one or more of the horizontal components mv.x and the vertical component mv.y of the motion vector are constrained to be smaller than T2 pixel.

In some examples, summation of the horizontal component mv.x and the vertical component mv.y of the motion vector is constrained to be smaller than T2 pixel.

In some examples, when distance between the initial motion vector and motion vector obtained after the integer motion refinement in the first step of the DMVR process is smaller than a second threshold T2, the second step in the DMVR process is disabled.

In some examples, the distance includes a magnitude of a horizontal component (mv.x) and a magnitude of a vertical component (mv.y).

In some examples, when one or more of the horizontal components mv.x and the vertical component mv.y of the distance are smaller than the threshold T2, the second step in the DMVR process is disabled.

In some examples, when summation of the horizontal component mv.x and the vertical component mv.y is smaller than the threshold T2, the second step in the DMVR process is disabled.

In some examples, T2 is determined based on at least one of: dimension of the first block, current quantization parameter, the magnitudes of the one or more initial motion vectors, and the magnitudes of motion vectors of neighboring blocks of the first block.

In some examples, T2 is signaled from encoder to decoder.

In some examples, the method further comprising: determining whether the second step of the DMVR process is enabled or disabled based on the one or more initial motion vectors in the DMVR process.

In some examples, when both of the initial motion vectors are integer motion vectors, the second step of the DMVR process is disabled.

In some examples, when the reference picture does not point to certain pictures, the second step of the DMVR process is disabled.

In some examples, when reference picture indices are not equal to 0, the second step of the DMVR process is disabled.

In some examples, when magnitudes of the one or more initial motion vectors are larger than a third threshold (T3), the second step of the DMVR process is disabled.

In some examples, the magnitudes of each initial motion vector include a magnitude of a horizontal component (mv.x) and a magnitude of a vertical component (mv.y).

In some examples, when one or more of the horizontal components mv.x and the vertical component mv.y of the initial motion vector are larger than the threshold T3, the second step of the DMVR process is disabled.

In some examples, when summation of the horizontal component mv.x and the vertical component mv.y of the initial motion vector is larger than the threshold T3, the second step of the DMVR process is disabled.

In some examples, when magnitudes of the one or more initial motion vectors are larger than a third threshold (T3) and/or and the initial motion vector is an integer motion vector, the second step of the DMVR process is disabled.

In some examples, T3 is determined based on at least one of: dimension of the first block, current quantization parameter, the magnitudes of the one or more initial motion vectors, and the magnitudes of motion vectors of neighboring blocks of the first block.

In some examples, T3 is signaled from encoder to decoder.

In some examples, precision of the initial motion vector in the DMVR process is determined based on an information signaled.

In some examples, the signaled information includes a flag present in the bitstream representation.

In some examples, the signaled information is signaled in at least one of the following: sequence level including sequence parameter set (SPS), slice level including slice header, tile group level including tile group header, picture level including picture header, and block level including coding tree unit and coding unit.

In some examples, a flag is signaled to indicate whether the initial motion vector in the DMVR process is rounded to integer motion vector.

In some examples, the flag indicating whether the initial motion vector in the DMVR process is rounded to integer motion vector further indicates additional information in addition to the initial motion vector in the DMVR process.

In some examples, a flag which indicate whether fractional MVD is allowed in a merge with motion vector difference (MMVD) mode, is used to indicate whether the initial motion vector in the DMVR process is rounded to integer motion vector.

In some examples, the flag is tile_group_fpel_mmvd_enabled_flag.

In some examples, whether to use a MVD candidate are adaptively changed based on precision of the initial motion vectors.

In some examples, the MVD candidates include MVD candidates used in the first step and/or second step of the DMVR process.

In some examples, when the initial motion vectors are sub-pel motion vectors, checking of a temporary motion vector is skipped if the temporary motion vector is an integer-pel motion vector, the temporary motion vector being derived from the initial motion vector and one MVD candidate.

In some examples, when the initial motion vectors are sub-pel motion vectors, checking of a temporary motion vector is skipped if the temporary motion vector is an sub-pel motion vector, the temporary motion vector being derived from the initial motion vector and one MVD candidate.

Figure 29:
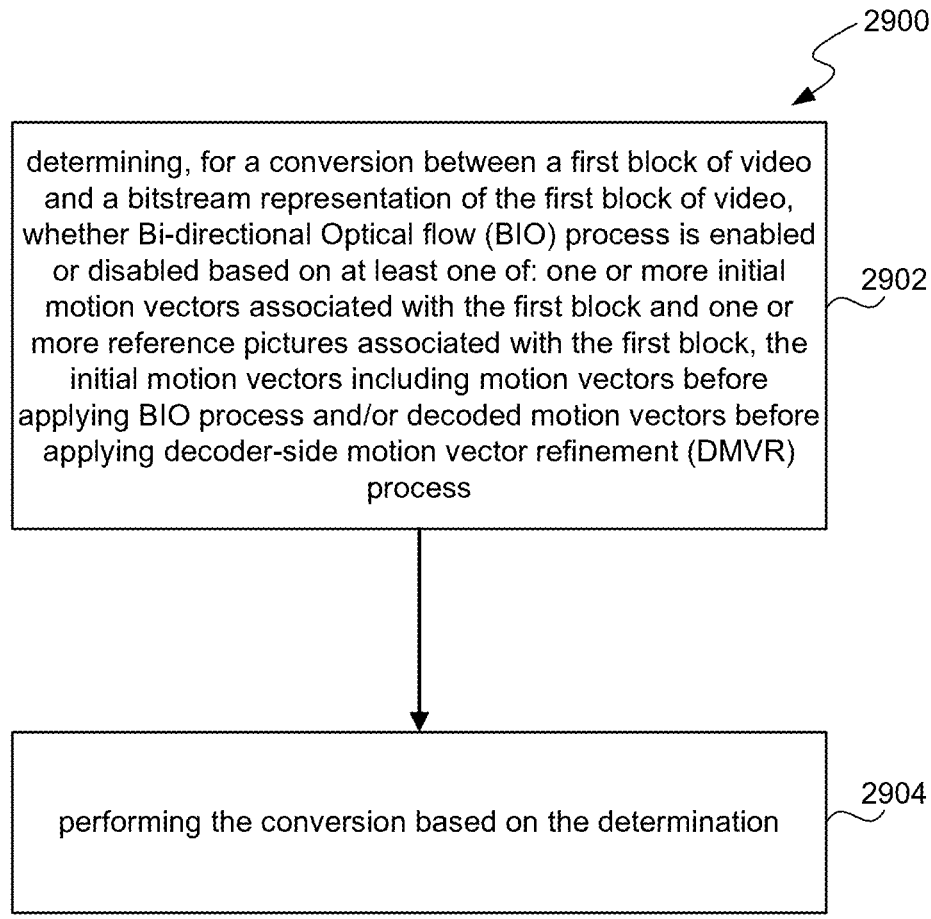
FIG. 29 shows a flowchart of an example method for video coding.

FIG. 29 is a flowchart for an example method 2900 of video processing. The method 2900 includes, at 2902, determining, for a conversion between a first block of video and a bitstream representation of the first block of video, whether Bi-directional Optical flow (BIO) process is enabled or disabled based on at least one of: one or more initial motion vectors associated with the first block and one or more reference pictures associated with the first block, the initial motion vectors including motion vectors before applying BIO process and/or decoded motion vectors before applying decoder-side motion vector refinement (DMVR) process; and at 2904, performing the conversion based on the determination.

In some examples, the BIO process is applied for at least one of a prediction unit, coding block and region associated with the first block during the conversion.

In some examples, the initial motion vectors include a first initial motion vector in a first direction and/or a second initial motion vector in a second direction.

In some examples, when both of the initial motion vectors are integer motion vectors, the BIO process is disabled.

In some examples, when the reference picture does not point to certain pictures, the BIO process is always disabled.

In some examples, when reference picture indices are not equal to 0, the BIO process is disabled.

In some examples, when magnitudes of the one or more initial motion vectors are larger than a fourth threshold (T4), the BIO process is disabled.

In some examples, the magnitudes of each initial motion vector include a magnitude of a horizontal component (mv.x) and a magnitude of a vertical component (mv.y).

In some examples, when one or more of the horizontal components mv.x and the vertical component mv.y of the initial motion vector are larger than the threshold T, the BIO process is disabled.

In some examples, when summation of the horizontal component mv.x and the vertical component mv.y of the initial motion vector is larger than the threshold T4, the BIO process is disabled.

In some examples, when magnitudes of the one or more initial motion vectors are larger than a fourth threshold (T4) and/or and the initial motion vector is an integer motion vector, the BIO process is disabled.

In some examples, T4 is determined based on at least one of: dimension of the first block, current quantization parameter, the magnitudes of the one or more initial motion vectors, and the magnitudes of motion vectors of neighboring blocks of the first block.

In some examples, T4 is signaled from encoder to decoder.

In some examples, the precision of the initial motion vector in the BIO process is determined based on a signaled information.

In some examples, the signaled information includes a flag present in the bitstream representation.

In some examples, the signaled information is signaled in at least one of the following: sequence level including sequence parameter set (SPS), slice level including slice header, tile group level including tile group header, picture level including picture header, and block level including coding tree unit and coding unit.

In some examples, a flag is signaled to indicate whether the initial motion vector in the BIO process is rounded to integer motion vector.

In some examples, the flag indicating whether the initial motion vector in the BIO process is rounded to integer motion vector further indicates additional information in addition to the initial motion vector in the BIO process.

In some examples, a flag which indicate whether fractional MVD is allowed in a merge with motion vector difference (MMVD) mode, is used to indicate whether the initial motion vector in the BIO process is rounded to integer motion vector.

In some examples, the flag is tile_group_fpel_mmvd_enabled_flag.

Figure 30:
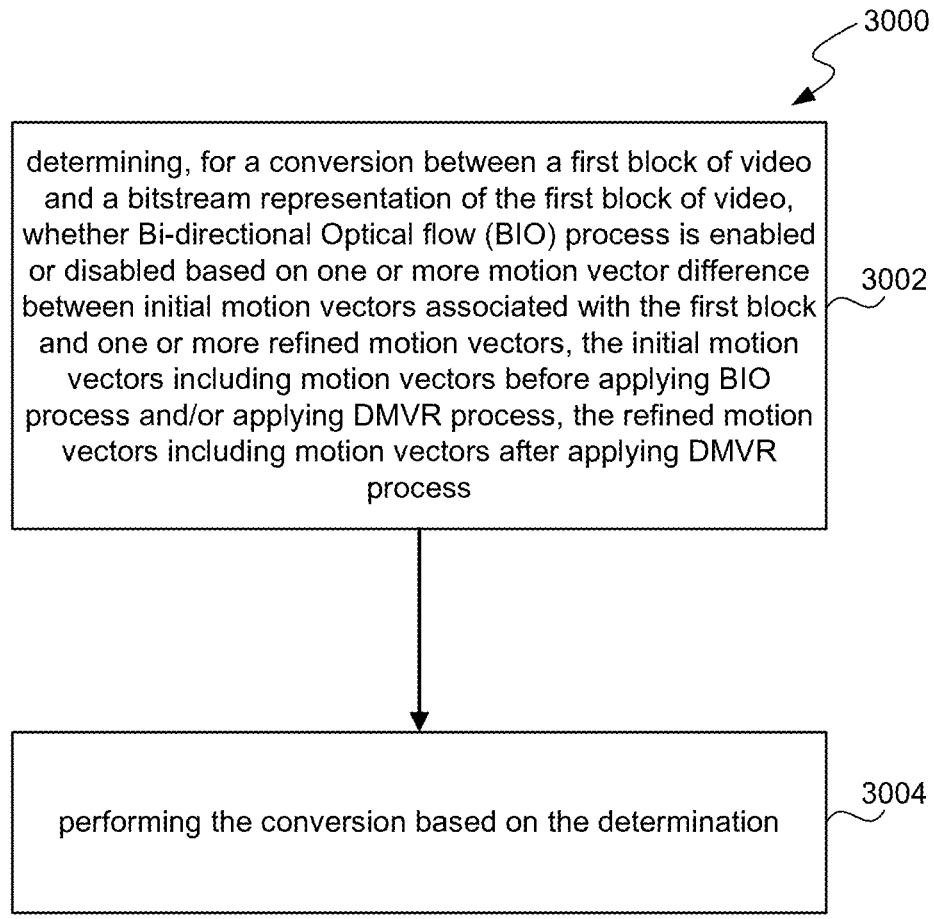
FIG. 30 shows a flowchart of an example method for video coding.

FIG. 30 is a flowchart for an example method 3000 of video processing. The method 3000 includes, at 3002, determining, for a conversion between a first block of video and a bitstream representation of the first block of video, whether Bi-directional Optical flow (BIO) process is enabled or disabled based on one or more motion vector difference between initial motion vectors associated with the first block and one or more refined motion vectors, the initial motion vectors including motion vectors before applying BIO process and/or applying DMVR process, the refined motion vectors including motion vectors after applying DMVR process; and at 3004, performing the conversion based on the determination.

In some examples, the BIO process is applied for at least one of a prediction unit, coding block and region associated with the first block during the conversion.

In some examples, when the motion vector differences are sub-pel, the updating of prediction samples or reconstruction samples is skipped.

In some examples, the conversion generates the first block of video from the bitstream representation.

In some examples, the conversion generates the bitstream representation from the first block of video.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
    determining, for a conversion between a first block of video and a bitstream of the first block of video, whether decoder-side motion vector refinement (DMVR) process is enabled or disabled based on at least one of: one or more initial motion vectors associated with the first block and one or more reference pictures associated with the first block, the initial motion vectors including motion vectors before applying DMVR process; and
    performing the conversion based on the determination,
    wherein, in response to magnitudes of the one or more initial motion vectors being larger than a threshold (T), the DMVR process is disabled.

2. The method of claim 1, wherein the DMVR process is applied for at least one of a prediction unit, coding block and region associated with the first block during the conversion.

3. The method of claim 1, wherein the initial motion vectors include a first initial motion vector in a first direction and/or a second initial motion vector in a second direction.

4. The method of claim 1, wherein the DMVR process is disabled due to satisfying at least one of a first condition that the reference picture does not point to certain pictures or a second condition that reference picture indices are not equal to 0.

5. The method of claim 1, wherein the magnitudes of each initial motion vector include a magnitude of a horizontal component (mv.x) and a magnitude of a vertical component (mv.y), and wherein when one or more of the horizontal components mv.x and the vertical component mv.y of the initial motion vector are larger than the threshold T, the DMVR process is disabled.

6. The method of claim 1, wherein T is signaled from encoder to decoder.

7. The method of claim 1, wherein the DMVR process includes a first step where an integer motion vector difference (MVD) refinement with integer precision is performed and a second step where a fractional MVD refinement with fractional precision is performed.

8. The method of claim 7, further comprising:
    determining whether the second step of the DMVR process is enabled or disabled based on a signaled information,
    and wherein the signaled information includes a flag present in the bitstream.

9. The method of claim 7, wherein a flag is signaled to indicate whether the second step of the DMVR process is enabled or disabled.

10. The method of claim 7, further comprising:
    determining how to perform the second step of the DMVR process is based on results of integer motion refinement in the first step of the DMVR process.

11. The method of any of claim 1, wherein precision of the initial motion vector in the DMVR process is determined based on an information signaled, wherein a flag is signaled to indicate whether the initial motion vector in the DMVR process is rounded to integer motion vector, wherein the flag indicating whether the initial motion vector in the DMVR process is rounded to integer motion vector further indicates additional information in addition to the initial motion vector in the DMVR process, and wherein a flag which indicate whether fractional MVD is allowed in a merge with motion vector difference (MMVD) mode, is used to indicate whether the initial motion vector in the DMVR process is rounded to integer motion vector.

12. The method of claim 8, wherein whether to use a MVD candidate are adaptively changed based on precision of the initial motion vectors.

13. The method of claim 12, wherein the MVD candidates include MVD candidates used in the first step and/or second step of the DMVR process.

14. The method of claim 1, wherein the conversion includes decoding the first block of video from the bitstream.

15. The method of claim 1, wherein the conversion includes encoding the first block of video into the bitstream.

16. An apparatus for processing video data comprising a processor and a non-transitory memory with instructions thereon, wherein the instructions upon execution by the processor, cause the processor to:

determine, for a conversion between a first block of video and a bitstream of the first block of video, whether decoder-side motion vector refinement (DMVR) process is enabled or disabled based on at least one of: one or more initial motion vectors associated with the first block and one or more reference pictures associated with the first block, the initial motion vectors including motion vectors before applying DMVR process; and perform the conversion based on the determination, wherein when magnitudes of the one or more initial motion vectors are larger than a threshold (T), the DMVR process is disabled.

17. The apparatus of claim 16, wherein the DMVR process includes a first step where an integer motion vector difference (MVD) refinement with integer precision is performed and a second step where a fractional MVD refinement with fractional precision is performed, and wherein the instructions upon execution by the processor, further cause the processor to:

determine whether the second step of the DMVR process is enabled or disabled based on a signaled information, and wherein the signaled information includes a flag present in the bitstream.

18. A method for storing a bitstream of a video, wherein the method comprises:

determining whether decoder-side motion vector refinement (DMVR) process is enabled or disabled based on at least one of: one or more initial motion vectors associated with a first block and one or more reference pictures associated with a first block, the initial motion vectors including motion vectors before applying DMVR process;

generating the bitstream based on the determination; and storing the bitstream in a non-transitory computer-readable recording medium, wherein, in response to magnitudes of the one or more initial motion vectors being larger than a threshold (T), the DMVR process is disabled.

19. The method of claim 18, wherein the DMVR process includes a first step where an integer motion vector difference (MVD) refinement with integer precision is performed and a second step where a fractional MVD refinement with fractional precision is performed, and wherein the method further comprises:

determining whether the second step of the DMVR process is enabled or disabled based on a signaled information, and wherein the signaled information includes a flag present in the bitstream.

20. The apparatus of claim 16, wherein the magnitudes of each initial motion vector include a magnitude of a horizontal component (mv.x) and a magnitude of a vertical component (mv.y), and wherein when one or more of the horizontal components mv.x and the vertical component mv.y of the initial motion vector are larger than the threshold T, the DMVR process is disabled.

* * * * *